United States Patent
Rapp

(10) Patent No.: US 11,581,945 B2
(45) Date of Patent: Feb. 14, 2023

(54) COMPENSATION OF SIGNAL DISTORATION INDUCED BY A PERIODIC OPTICAL COPROPAGATING OPTICAL SIGNAL

(71) Applicant: Xieon Networks S.A.R.L., Luxembourg (LU)

(72) Inventor: Lutz Rapp, Deisenhofen (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 36 days.

(21) Appl. No.: 17/310,913

(22) PCT Filed: Feb. 25, 2020

(86) PCT No.: PCT/EP2020/054871
§ 371 (c)(1),
(2) Date: Aug. 30, 2021

(87) PCT Pub. No.: WO2020/178073
PCT Pub. Date: Sep. 10, 2020

(65) Prior Publication Data
US 2022/0140904 A1 May 5, 2022

(30) Foreign Application Priority Data
Mar. 1, 2019 (EP) .................................... 19160392

(51) Int. Cl.
*H04B 10/071* (2013.01)
*H04B 10/69* (2013.01)
(Continued)

(52) U.S. Cl.
CPC ....... *H04B 10/2543* (2013.01); *H04B 10/071* (2013.01); *H04B 10/2531* (2013.01);
(Continued)

(58) Field of Classification Search
None
See application file for complete search history.

(56) References Cited

U.S. PATENT DOCUMENTS 5,450,191 A * 9/1995 Parks ................. G01M 11/3109
356/73.1
7,564,866 B2 * 7/2009 Agazzi ................ H03M 1/0624
370/466
(Continued)

FOREIGN PATENT DOCUMENTS

EP 1679810 A1 7/2006
EP 1780914 A1 5/2007

OTHER PUBLICATIONS

International Search Report issued in connection with PCT Application No. PCT/EP2020-054871, dated May 15, 2020.
(Continued)

*Primary Examiner* — Jai M Lee

(57) ABSTRACT

The disclosure relates to a method, an optical receiver and an optical system for compensating, at an optical receiver, signal distortions induced in an optical carrier signal by a periodic copropagating optical signal, wherein the optical carrier signal and the copropagating signal copropagate at least in part of an optical system or network, by: receiving, at the optical receiver, the optical carrier signal, wherein the optical carrier signal is distorted by the copropagating signal; determining, at the optical receiver, a period of a periodic component of the distorted optical carrier signal; determining, at the optical receiver, a periodic distortion of the distorted optical carrier signal; and generating a compensation signal to correct the distorted optical carrier signal according to the determined periodic distortion.

15 Claims, 20 Drawing Sheets

(51) Int. Cl.
*H04B 10/2543* (2013.01)
*H04B 10/2507* (2013.01)
*H04B 10/2531* (2013.01)
*H04B 10/61* (2013.01)

(52) U.S. Cl.
CPC ... *H04B 10/25073* (2013.01); *H04B 10/6163* (2013.01); *H04B 10/6165* (2013.01); *H04B 10/697* (2013.01)

(56) References Cited

U.S. PATENT DOCUMENTS

| | | | | |
|---|---|---|---|---|
| 8,331,805 | B2 * | 12/2012 | Nakashima | H04B 10/61 398/208 |
| 8,855,503 | B2 * | 10/2014 | Kikuchi | H04B 10/612 398/208 |
| 8,891,980 | B2 * | 11/2014 | Mo | H04L 7/0075 398/208 |
| 2007/0098164 | A1 * | 5/2007 | Bulow | H04B 10/2572 380/208 |
| 2020/0403712 | A1 * | 12/2020 | Alishahi | H04B 10/697 |

OTHER PUBLICATIONS

European Search Report issued in connection with Application No. 19160392.7 dated Sep. 30, 2019.

Scheerer C. "OTDR pulse power limit in on-line monitoring of optical fibres owing to stimulated Rama scattering", Electronics Letters, IEE Stevenage, GB, vol. 32, No. 7, Mar. 28, 1996, pp. 679-680.

Sungho Bae et al. "In-service monitoring of cascaded EDFA WDM links using counter-propagating OTDR pulses", Communications, Oct. 18, 1999, pp. 436-437, vol. 1.

Gregory P C et al. "New method for the detection of a periodic signal of unknown and period," Astrophysical Journal, University of Chicago Press, Chicago, US, vol. 398, No. 1, part 01, Oct. 10, 1992, pp. 146-168.

* cited by examiner 1a
1b
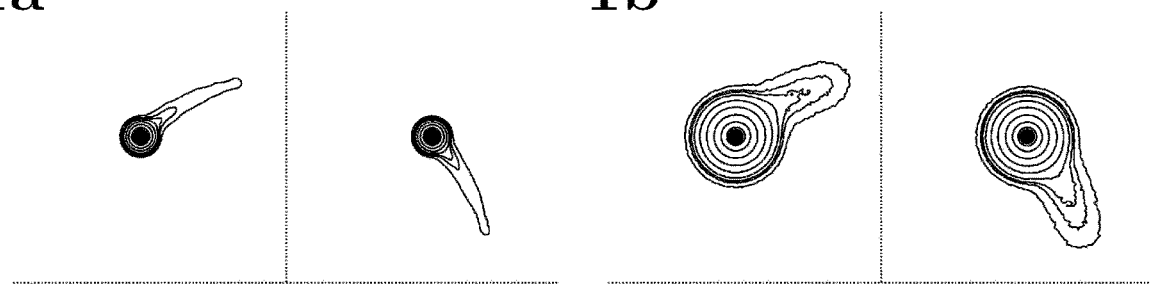
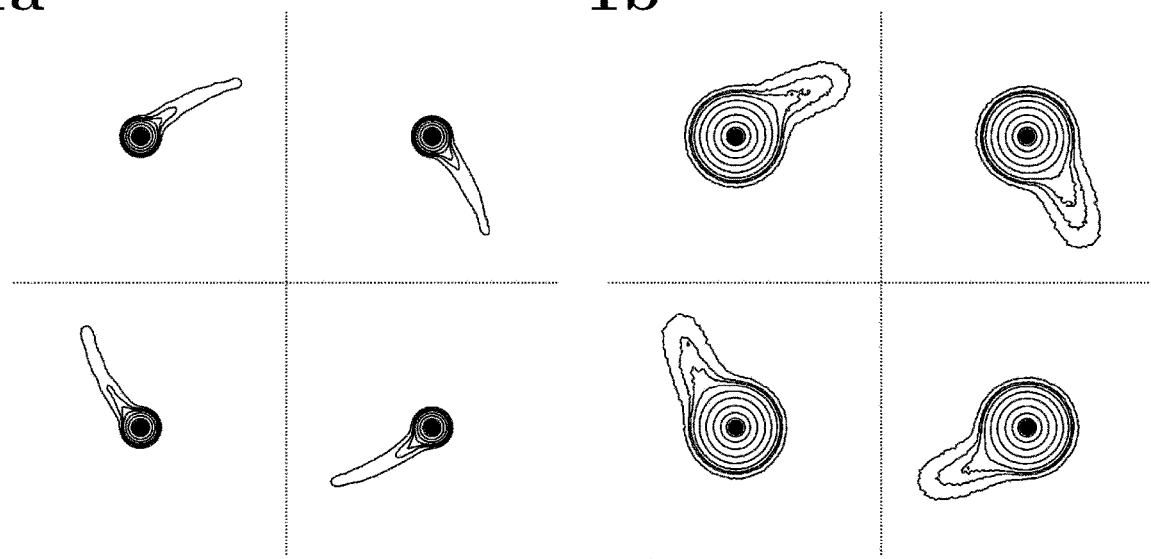
1c
1d
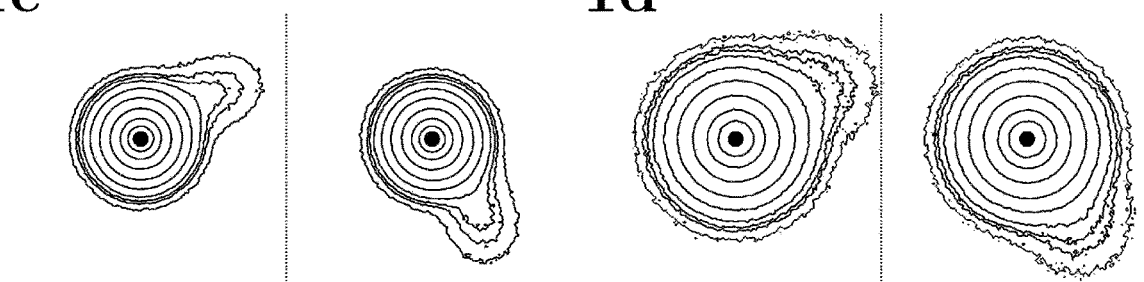
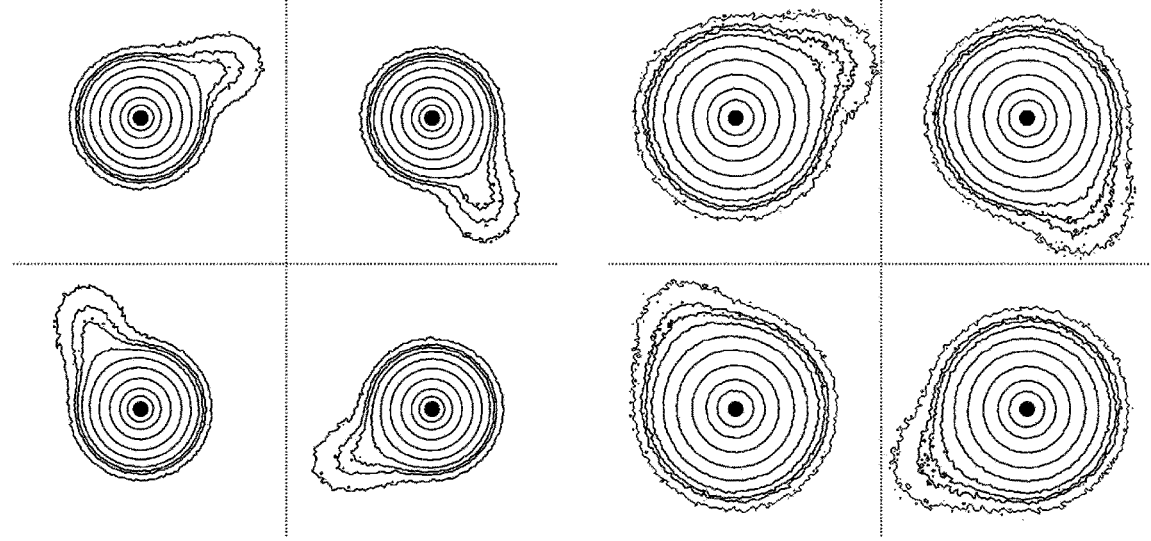
Fig. 1

12a
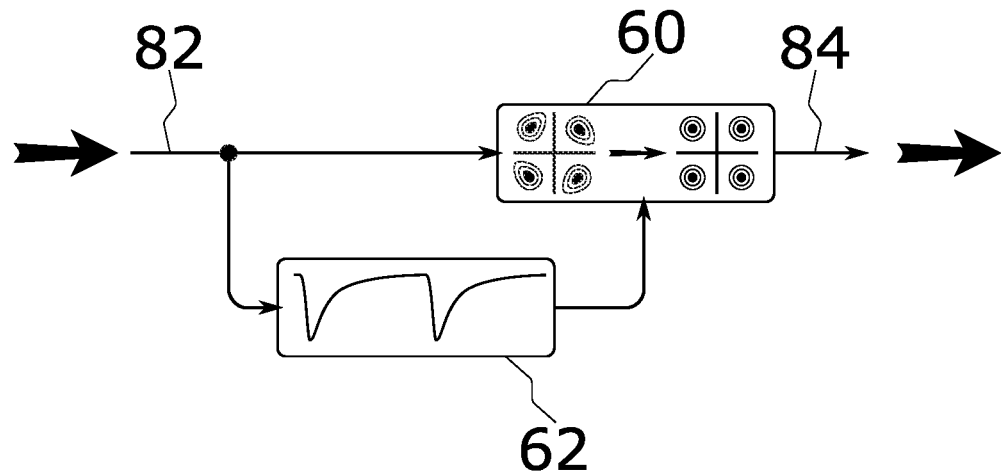
12b
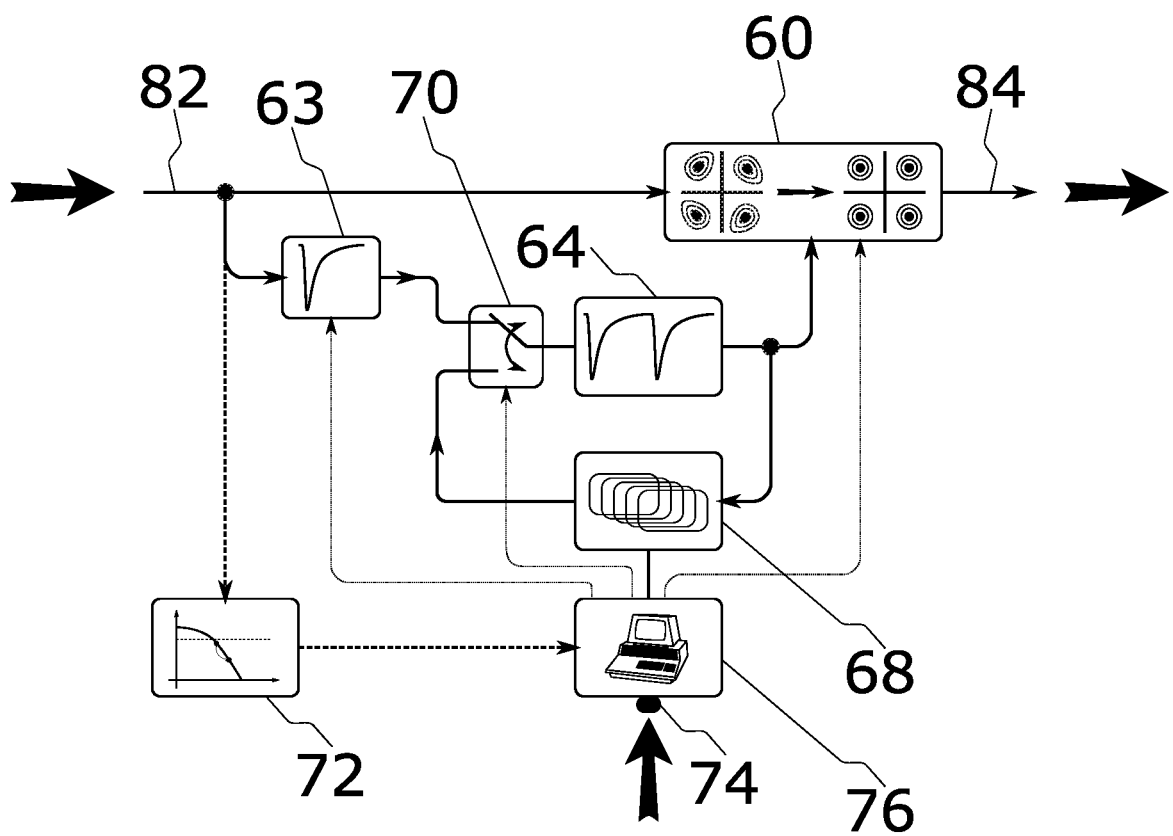
Fig. 12

18a
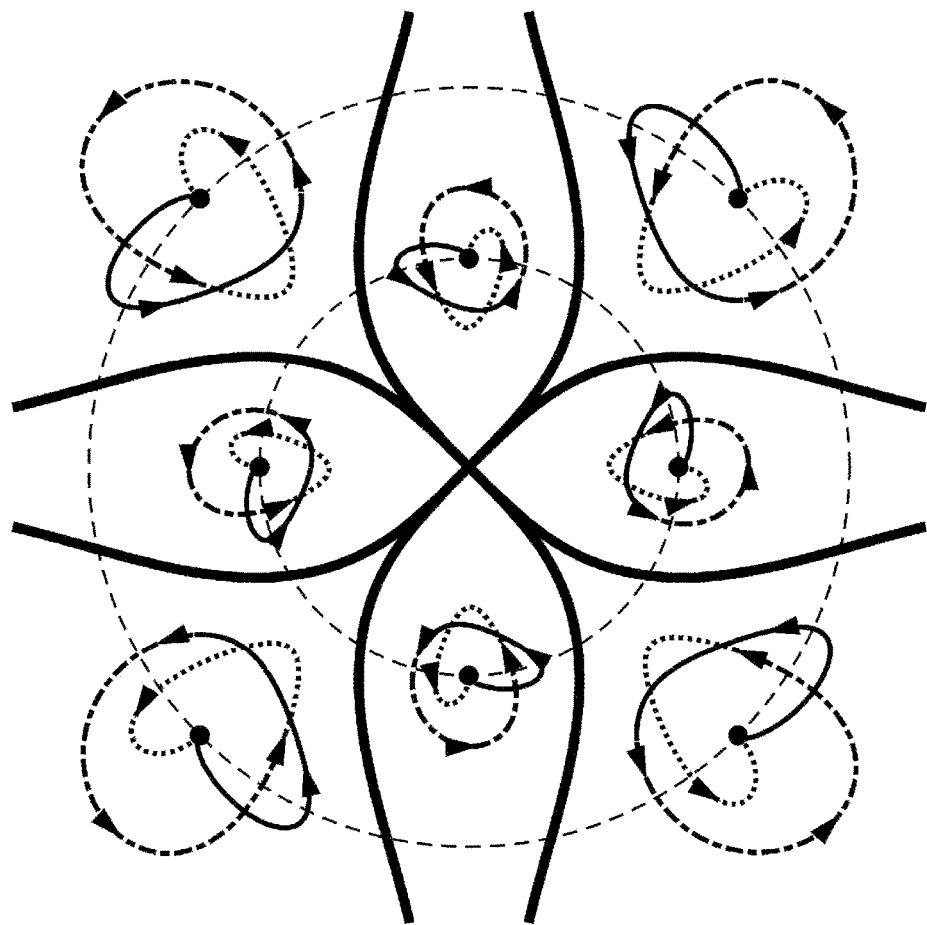
18b
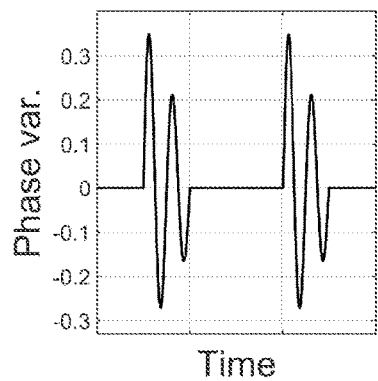
18c
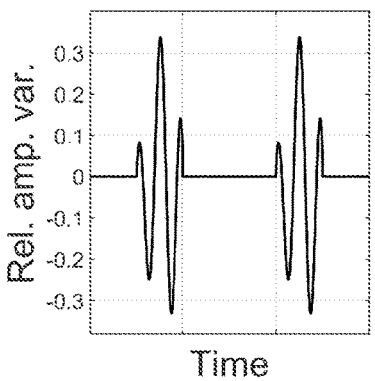
18d
Trajectory of distortions
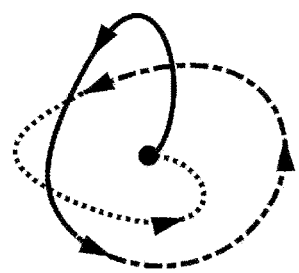
Fig. 18

COMPENSATION OF SIGNAL DISTORATION INDUCED BY A PERIODIC OPTICAL COPROPAGATING OPTICAL SIGNAL

CROSS-REFERENCE TO RELATED APPLICATIONS

This is a 35 U.S.C. 371 National Stage Patent Application of International Application No. PCT/EP2020/054871, filed Feb. 25, 2020, which claims priority to European application 19160392.7, filed Mar. 1, 2019, each of which is hereby incorporated by reference in its entirety.

FIELD OF THE INVENTION

The present invention is in the field of fiber-optic communications. In particular, the invention relates to methods and means for compensating signal distortions induced on an optical carrier signal by a periodic copropagating optical signal and to methods and means for transmitting optical signals in an optical network monitored by copropagating optical signals with an improved performance.

BACKGROUND ART

Wavelength division multiplexing (WDM) has become a preferred solution for transmitting large amounts of data over long distances. Using this technology, several optical signals emitted by optical transmitters may be joint by optical multiplexers on a single optical fiber to form a WDM signal. In order to receive the individual signals, the optical signals may be separated by optical demultiplexers. During propagation in an optical network, some channels may be added or dropped by means of reconfigurable optical add drop multiplexers (ROADMs) or photonic crossconnects (PXCs), or parts of the WDM signal may be directed to different directions by PXCs. The section of an optical network within which the spectral composition of the transmitted WDM signal does not change is denoted optical multiplex section (OMS). Thus, in some examples of optical networks without wavelength conversion, optical multiplex sections may span from a multiplexer to a demultiplexer, from a multiplexer to a PXC or ROADM, or from a PXC or ROADM to a demulitplexer. The terms "multiplexer" and "demultiplexer", as used herein, may refer to network elements providing the corresponding functionality or to an optical component used for implementing such functionality.

Optical networks allow exchanging information between various nodes that may be typically located several kilometers apart from each other and that may be mutually connected by optical fiber spans. An "optical node", as used herein, may refer to a location in an optical network where traffic starts, is directed to different directions, or is terminated. The information exchange is enabled by transmitting optical signals on which the information has been encoded. These optical signals are propagating in optical fibers serving as transmission fibers and connecting different nodes of an optical network. In order to protect the fibers against mechanical stress, the fibers may be arranged in optical cables. The term "optical path", as used herein, may refer to an entire route followed by an optical signal through an optical system or network from a transmitter to an optical receiver without intermediate optical-to-electrical conversion.

Communication between two nodes of a network may be enabled by physical devices located at the two involved network nodes. Furthermore, some physical devices such as optical amplifiers might be located between the network nodes. These physical devices may be generally referred to herein as "network devices" or as "network elements". "Network elements" or "network devices" may be managed by a so-called Network Element Manager (NEM). The different functionalities a network element can provide may comprise emitting, amplifying, redirecting, and receiving optical signals. For example, a set of transmitters and receivers connected to the same end of a fiber connection, optical amplifiers and photonic crossconnects (PXCs) may correspond to individual network elements. The entire equipment making up a network element may be located within one building. An optical fiber or optical cable mutually connecting different network elements may be referred to as an "optical span" or a "span", and may include devices that add, subtract, or attenuate optical signals.

Some of the technical terms introduced above are illustrated in FIG. 20 showing part of an optical network 160 comprising three network nodes 280, 282 and 284 at which traffic starts, is routed to different directions or is terminated. Optical signals are transmitted via optical fibers 12a-e, each forming part of one of the optical fiber spans 40a-e. The different optical fiber spans are connected to optical amplifiers 14a-d and to a photonic crossconnect 20, which may comprise further optical amplifiers. Each of the amplifiers and the photonic crossconnect is again embedded in one of the optical network elements 254-262.

Network node 280 comprises two network elements 252 and 254. In network element 252, optical signals emitted by several transmitters 8, 8a are joined into a WDM signal by means of an optical multiplexer 24. Finally, the power of the generated WDM signal is increased by means of an optical amplifier 14a forming part of the second network element 254 in network node 280. Optical network node 284 also comprises two network elements, namely network element 262 for amplifying the incoming WDM signal and network element 264 for splitting and receiving the optical signals transported via the WDM signal received by optical network node 284.

In the intermediate network node 282, which may correspond to a photonic crossconnect, a part of the optical signals or channels is directed towards network node 284, whereas other channels are routed in a different direction via the optical fiber 12e. Furthermore, some channels may be added in this network node. Since the spectral composition of the WDM signal is not altered in the section from network node 280 to network node 282, this part of the network may correspond to an OMS 42a. The section from network node 282 to network node 284 may correspond to a second OMS 42b. The optical channels transported via OMS 42b to network node 284 are separated there and each of them is directed to a dedicated optical receiver ma, 10. The optical route from the transmitter 8a to the optical receiver ma may serve for transmitting an optical signal without intermediate optical-to-electrical conversion and corresponds to an optical path 90.

While technological advances have traditionally been focused on increasing transmission capacity, other aspects, in particular network monitoring, are becoming increasingly relevant. When managing fiber optic communication networks, data performance across the network is a key factor, and obtaining information about it is of crucial importance. Therefore, there is an increasing demand in the markets for monitoring capabilities for fiber optic systems. Detailed information about a fiber optic system may be obtained by means of monitoring techniques like optical time domain reflectometry (OTDR). Information about a complete fiber optic span is obtained in some cases by means of bidirectional measurements from both ends of the fiber optic span, for instance, by means of bidirectional OTDR measurements, which include both codirectional and counterdirectional OTDR signals, that is, measurements with codirectional or copropagating OTDR signals that propagate in the same direction as an optical carrier signal for transmitting information and with counterdirectional or counterpropagating OTDR signals that propagate in the opposite direction as the carrier signal.

An optical time-domain reflectometer (OTDR) is an optoelectronic measurement device used to characterize an optical fiber by injecting series of pulses into one end of an optical fiber and by analyzing light corresponding to light of said pulses reflected within the optical fiber. Part of the light of the pulses injected into an optical fiber may be reflected back to the location at which the pulses were originally injected due to Rayleigh scattering and to light reflection in the fiber. Detecting the reflected light may hence allows retrieving information about the characteristics of the optical fiber. OTDR measurements technique are hence based on detecting reflected light. Therefore, OTDR measurements may be impaired in the presence of an optical isolator in the optical path followed by light transmitted over the optical fiber being measured, unless the OTDR pulses can be bypassed around the optical isolator. Since optical amplifiers currently used in terrestrial systems and networks typically contain optical isolators but no bypassing means, the measurement range of OTDR devices mab be strongly limited, for example restricted to single optical spans. Consequently, network-wide OTDR measuring may require launching separate series of OTDR pulses into each span.

Further, forward-directed monitoring signals, like codirectional OTDR signals, may cause severe signal distortions due, at least in part, to non-linear fiber effects. OTDR signals typically have a periodic structure and comprise pulses, OTDR pulses, which have a given period. A copropagating periodic monitoring signal can cause periodic distortions on the carrier signals being transmitted that may lead to deteriorated transmission performance, for example due to self-phase modulation (SPM) or cross-phase modulation (XPM). While such non-linear effects can be compensated in some situations, this is only fully viable if the signal inducing the distortions is known at a receiving end. Nevertheless, the precise form and magnitude of these distortions usually remains unknown, which makes it difficult to compensate such distortions such as to remove them from the transmitted signals at a receiver end.

For example, an optical signal received at a receiving end may have been previously distorted by a copropagating monitoring signal in one or more segments of an optical transmission path of origin. In cases in which the copropagating monitoring signal is not received at the receiving end, the copropagating optical signal is not available for compensation purposes at the receiver. In cases in which the copropagating optical signal is received at the receiving end, the receiving end lacks information about the original characteristics of the copropagating optical signal corresponding to the segments in which the distortion took place. Directly providing information about these characteristics to the receiving end requires a large transmission capacity within a network element located at the receiving end. In case several signals are travelling along the same optical path, signals received by the individual receivers could theoretically be provided to the other receivers in the same optical network node for compensation purposes. However, this solution is quite impractical since it causes huge amount of traffic within the network node. Therefore, signal compensation techniques, such as digital back propagation (DBP) are typically limited to compensate for distortions induced by the optical signal itself, in particular by SPM, and do not fully account for distortions caused by copropagating optical signals.

Alternatively, distortions caused by a monitoring signal can be reduced by lowering the power of the monitoring signal. However, this is not satisfactory, inasmuch as it leads to a reduced monitoring range.

Thus, there is room for technical improvement for detecting the signal distortions caused by copropagating monitoring signals in fiber-optic communication systems.

SUMMARY OF THE INVENTION

The problem underlying the invention is to provide an optical system and a method for compensating signal distortions induced in an optical carrier signal by a periodic optical copropagating optical signal. This problem is solved by a method according to claim 1, by a readable storage medium according to claim 21, by a signal processing unit according to claim 22, and by an optical system according to claim 27. Preferred embodiments of the invention are defined in the dependent claims.

In a first aspect, the invention disclosed herein refers to a method of compensating at an optical receiver signal distortions induced in an optical carrier signal by a periodic optical copropagating optical signal. An "optical carrier signal" refers herein in a broad manner to an optical signal used to encode information to be transmitted in an optical network, while "optical copropagating optical signal" or "copropagating optical signal" refers in a broad manner to another optical signal that may propagate at least over some distance in the same optical path, for example in the same optical fiber, and at the same time as the optical carrier signal. Thus, the optical carrier signal and the copropagating optical signal copropagate at least in part. The copropagating optical signal may propagate with respect to the carrier signal codirectionally, i.e. in the same direction as the optical carrier signal, counterdirectionally, i.e. in the opposite direction as the optical carrier signal, or bidirectionally, i.e. both codirectionally and counterdirectionally.

The copropagating optical signal may for example correspond to an optical signal used for monitoring purposes, such as an OTDR signal, which may be used to characterise an optical fiber through which the carrier signal and the copropagating optical signal are being transmitted. An "optical receiver" is meant to refer in a general manner to any receiving apparatus of an optical network suitable to receive an optical signal, in particular the carrier signal and the copropagating optical signal.

The carrier signal and the copropagating optical signal may be in different frequency ranges. For example, the carrier signal may be in a frequency range between 191.6 THz (1565 nm) and 195.9 THz (1530 nm) and the copropagating optical signal may be in a frequency range between 197.2 THz (1520 nm) and 199.9 THz (1500 nm) or in a frequency range between 180.6 THz (1660 nm) and 185.1 THz (1620 nm).

In some embodiments, the optical carrier signal may be a multichannel optical signal or part of a multichannel optical signal, and the copropagating optical signal may correspond to one or more of the channels of the multichannel optical signal. A multichannel optical signal may for example be a multiplex optical signal.

The copropagating optical signal is a periodic signal, which means that it may have a waveform with a periodic variation over time or at least a periodic component, in particular a periodic amplitude or intensity variation and a given period. For example, a periodic signal may comprise a pattern within a measurable period of time called "period" that repeats itself completely successive times. A signal may be referred to herein as "periodic" if, for example, a pattern is repeated at least twice within any period of time.

The copropagating optical signal may comprise pulses that repeat periodically in time, wherein a "pulse" is meant to refer to an amplitude variation over time with a determined frequency or period. For example, a "pulse" may refer herein to a rapid transient change of a physical parameter characterizing the waveform of a signal from a baseline value to a higher or lower value, followed by a rapid return to the baseline value. The copropagating optical signal may be characterised by the waveform within one period and the period of such pulses. Other related quantities, like the duty cycle, may also be used to characterise pulses of the copropagating optical signal. In some examples, the copropagating optical signal may correspond to square periodic pulses or to half-wave rectified sinusoidal pulses.

The method of the invention comprises a step of receiving, at the optical receiver, the optical carrier signal, wherein the optical carrier signal is distorted by the copropagating optical signal. Thus, when the optical carrier signal is received at the optical receiver, the optical carrier signal is a signal distorted by the copropagating optical signal. For example, the optical carrier signal may be received at the optical receiver after having been distorted by the copropagating optical signal during propagation, for example in a previous part of the optical path of the optical carrier signal to the optical receiver, like an optical fiber.

However, the optical carrier signal may still be distorted by the copropagating optical signal when the optical carrier signal is received at the optical receiver, e.g. due to crosstalk. In some embodiments, the method further comprises receiving, at the optical receiver, the copropagating optical signal and/or optical carrier signal as a combined signal.

The copropagating optical signal may copropagate with the optical carrier signal in a part of the optical path and may or not be received at the optical receiver. When the copropagating optical signal and the carrier signal propagate together, they may form a combined signal that propagates over at least a part of an optical path in which the distortion takes place. Thus, the optical carrier signal and the copropagating optical signal may be received at the optical receiver as part of the same signal, i.e. the combined signal, wherein both signals may be transmitted over the same optical fiber. For example, if the copropagating optical signal is coupled into an optical path in which the optical carrier signal is propagating in a proximity of the optical receiver, the copropagating optical signal may be received at the optical receiver in spite of signal attenuation, even in cases in which the copropagating optical signal is not amplified.

However, the copropagating optical signal may copropagate with the optical carrier signal and distort the optical carrier signal only for a part of an optical path of the optical carrier signal to the optical receiver, wherein the copropagating optical signal may only be effectively detectable and/or may only perceivably distort the optical carrier signal within the aforesaid part, and wherein said part may end before the copropagating optical signal reaches the optical receiver. For example, after the copropagating optical signal interacts with the optical carrier signal, the resulting combined signal may have to propagate over several segments of optical path, for instance optical fibers, and/or through several nodes of an optical network before arriving at the optical receiver. In some examples, for instance if the combined signal is not amplified in a frequency range in which the copropagating optical signal propagates, the copropagating optical signal may be progressively attenuated and no longer be detectable when the combined signal arrives at the optical receiver, such that the combined signal received at the optical receiver may mainly comprise the optical carrier signal.

"Distortion" refers herein in a general manner to any uncontrolled or unwanted modification of the optical carrier signal with respect to the original optical carrier signal that was emitted at an emitting end, i.e. with respect to an ideal optical carrier signal that would arrive at the optical receiver in a hypothetical absence of disturbances of any kind. Unlike noise, signal distortions caused by a periodic copropagating optical signal typically manifest themselves as a deterministic distortion in the distorted signal. In particular, the periodic copropagating optical signal may cause a periodic distortion in the optical phase of the combined signal due to cross-phase modulation (XPM), for example a phase shift. This is shown in the exemplary constellation diagrams of FIG. 1, in which the effects of both noise and a distortion caused by a periodic distorting signal upon the same optical signal with quaternary phase shift keying (QPSK) modulation are illustrated for four different intensities of the copropagating optical signal, i.e. for four different strengths of the interaction between the copropagating optical signal and the carrier signal. The optical carrier signal may be affected by the same noise level in all cases, while the magnitude of the phase variations may be different due to different strength of the interaction. The periodic distortions may cause a phase reduction of the optical carrier signal, which manifests itself in the diagrams of FIG. 1 as a bulge or nose.

The method of the invention comprises a further step of determining, at the optical receiver, a period of a periodic component of the distorted optical carrier signal. Since the carrier signal is distorted by the periodic copropagating optical signal, the period of said periodic component of the optical carrier signal received at the optical receiver is directly related to the time characteristics of the periodic copropagating optical signal and hence related to the distortion induced upon the optical carrier signal by the periodic optical copropagating optical signal. There are different ways for detecting the period of a previously unknown periodic pattern in a signal. One of the realisations by the present inventor is that mathematical techniques that have been used in the field of astronomy for the detection and estimation of periodic patterns in datasets without any prior knowledge of the existence of such a signal or of its characteristics can be applied in the field of fiber-optic communications to detect and characterise signal distortions caused by a periodic copropagating optical signal at an optical receiver without requiring previous knowledge of the distorting periodic signal. Such techniques are described in detail for example in the article "A new method for the detection of a periodic signal of unknown shape and period" by P. C. Gregory and T. J. Loredo, Astrophysical Journal, vol. 398, no. 1, October 1992, p. 146-168. Therein, a method, the meanwhile known as Gregory-Loredo algorithm, is described, which allows estimating the period of an unknown periodic pattern with respect to the observation of X-ray pulsars based on Bayesian probability theory.

The use of such algorithms according to the present invention may allow saving bandwidth for communication, for no bandwidth needs to be devoted to the transmission of information about the copropagating optical signal between an emitting or receiving end, at which the copropagating optical signal may be emitted or received, and an optical receiver, at which the optical carrier signal is received, for distortion compensation purposes. Instead, the periodic structure of the distorted optical carrier signal can be determined at the optical receiver based on the distorted optical carrier signal received at the optical receiver without requiring further information about the disturbing copropagating optical signal.

Nevertheless, less sophisticated techniques may also be used for determining the distortion caused by the periodic component of the optical carrier signal according to the present invention, in particular techniques based on partial previous knowledge of the copropagating optical signal, in particular on knowledge of the period of the distorting periodic copropagating optical signal. Notably, providing this partial knowledge by transmitting the information required by the method of the invention requires less bandwidth than providing a complete distorting signal. Typically, incomplete information about the distorting copropagating optical signal, for example information comprising only the period of the copropagating optical signal, would per se not be sufficient for reconstructing the copropagating optical signal and/or for accounting for the distortions caused by the copropagating optical signal. However, the aforementioned algorithms used according to the present invention allow determining distortions of the optical carrier signal caused by the copropagating optical signal and hence accounting for the distortions caused by the copropagating optical signal relying on said uncomplete information, for example on the period of the copropagating optical signal. Knowledge of the period of the distorting periodic copropagating optical signal may for example be directly obtained via an input signal received from an emitting end at which the copropagating optical signal is generated. For example, the input signal may be provided by the optical supervisory channel (OSC).

The method of the invention comprises a further step of determining, at the optical receiver, a periodic distortion of the distorted optical carrier signal. Said periodic distortion is caused by the copropagating optical signal. In some embodiments, the periodic distortion may comprise a phase variation and/or an amplitude variation of the distorted optical carrier signal, such that determining the aforesaid periodic distortion of the optical carrier signal may comprise detecting a periodic phase variation and/or an amplitude variation of the optical carrier signal. The phase variation of the optical carrier signal, which may be due, at least in part, to the non-linear effects caused by the copropagating optical signal, can be determined, for example, using a Viterbi-Viterbi phase recovery technique to determine a series of phase variations of the carrier signal corresponding to respective periods of the periodic component of the optical carrier signal.

The determined distortion may correspond at least in part or completely to a real phase shift of the carrier signal caused by the copropagating optical signal, which may include, for example, distortions caused by non-linear effects such as self-phase modulation (SPM) and cross phase modulation (XPM).

Additionally or alternatively, the determined distortion may correspond at least in part or completely to an imaginary phase shift, i.e. an amplitude variation, of the carrier signal caused by the copropagating optical signal, for example due to distortions caused by Raman scattering.

The periodic component of the carrier signal, for example a waveform thereof, corresponding to the distortion may correspond at least in part or completely to the periodic copropagating optical signal, for example to a waveform of the copropagating optical signal.

The method of the invention further comprises a step of generating a compensation signal to correct the distorted optical carrier signal by the determined periodic distortion. Thus, the distorted carrier signal received at the optical receiver is corrected taking into account the distortion caused by a periodic component of the optical carrier signal that has been previously determined in order to remove, i.e. compensate, the distortions of the carrier signal. For example, if the determined signal distortion corresponds to a variation of the phase of the carrier signal by a value $\theta$, i.e. to a variation of the carrier signal by a factor $e^{i\theta}$, the compensation signal may be generated such that the timely coordinated combination thereof with the carrier signal corresponds to an additional variation of the phase of the carrier signal by a value $-\theta$, i.e. to an additional variation of the carrier signal by a factor $e^{-i\theta}$. In this way, the signal distortion caused by the periodic copropagating optical signal can be compensated at the optical receiver. This example is illustrated in FIG. 2, which represents one period of a distorting periodic copropagating optical signal.

The compensation signal may be an optical signal or an electrical signal. If the compensation signal is an optical signal, the compensation signal may be optically combined with the carrier signal in order to compensate the signal distortion caused by the periodic copropagating optical signal. If the compensation signal is an electrical signal, the compensation signal may be electrically combined with an electrical detection signal corresponding to the carrier signal to compensate signal distortion caused by the periodic copropagating optical signal.

In some embodiments, generating the compensation signal may comprise applying the Viterbi-Viterbi phase recovery technique to the distorted optical carrier signal. For example, if this technique is applied to a received optical carrier signal corresponding to a QPSK signal, a single mathematical operation, namely calculation of the fourth power of the received optical carrier signal, may allow removing the encoded information from the received optical carrier signal and determining the corresponding periodic distortions. However, the described compensation technique is compatible with any method yielding the distortions experienced by an optical signal, for example detecting a transmitted symbol and calculating signal distortions by subtracting the detected symbol from a received signal.

The present invention is based on the realization by the inventor that, if a distortion of a carrier signal being transmitted is known to be caused at least in part by a periodic copropagating optical signal, the mere fact that the distorting signal be periodic can be exploited at a receiving end, i.e. the optical receiver, to obtain information about the distortion induced upon the carrier signal so as to compensate it. The invention hence relies on the use of periodicity as an indicator of distortions. Notably, while partial knowledge of the periodic copropagating optical signal may ease the determination of the distortions induced upon the carrier signal by the copropagating optical signal, the method of the invention allows compensating the distortion caused by a periodic copropagating optical signal without requiring that full knowledge of the precise shape and/or period of the copropagating optical signal be provided to the receiver in addition to the received carrier signal.

The period of the distortions induced on the optical carrier signal by the periodic copropagating optical signal corresponds to the period of this copropagating optical signal. This feature is exploited according to the present invention for compensating the distortions in the optical carrier signal caused by the copropagating optical signal in a simple manner.

Due to the possibility of compensating distortions at a receiving end, i.e. the optical receiver, the invention allows operating with a copropagating periodic signal without a significant limitation of the power thereof, despite the fact that non-linear effects may be proportional to signal power. Therefore, the invention may allow for copropagating periodic signals having a higher power than in solutions known from the prior art without compromising transmission quality. Further, as compared to previously known solutions, the present invention allows achieving longer measurement ranges for the copropagating optical signal.

Since the compensation signal can be generated locally at a receiving end, i.e. at the optical receiver, no bandwidth needs to be devoted to the transmission and coordination of compensation signals between different nodes of an optical network. Instead, a compensation signal may be generated independently at each node of the network. This may spare the transmission of large amounts of data between the nodes of the optical network that would otherwise be required for communicating the properties of the compensation signal to be applied.

The copropagating periodic signal may correspond, for instance, to an OTDR or an optical supervisory channel (OSC) signal. The invention has the advantage of allowing monitoring copropagating optical signals of a higher optical power. This may allow reducing the number of devices for emitting optical monitoring copropagating periodic signals in an optical network without thereby losing monitoring capabilities. Compared to previously known solutions, the increased power of an optical monitoring copropagating periodic signal that is made compatible with an acceptable transmission quality by means of the present invention, may for example allow installing a monitoring device, like an optical time domain reflectometer, at every second network node instead of at every second network, thereby reducing the maintenance costs and complexity of the network by a factor of 2.

According to some preferred embodiments of the invention, determining the period of a periodic component of the distorted optical carrier signal may comprise receiving an input signal indicating the period of the copropagating optical signal. The input signal may be received from an emitting end at which the copropagating is generated. For instance, if the copropagating optical signal corresponds to an OTDR signal, an OTDR emitting device that generates the OTDR signal may be connected to the optical receiver and configured to transmit to the optical receiver the value of the period of the pulses of the OTDR signal that is being generated or that is to be generated. The input signal indicating the period of the copropagating optical signal may be transmitted to the optical receiver optically, for example through the same optical fiber in which the carrier signal and the copropagating optical signal are transmitted, or by any other means, such as wireless communication. In some examples, the input signal may be provided via a network management system to which all network elements of an optical network on which the method of the invention is implemented are connected. The input signal may have a data rate of between 1 kbit/s and 1 Tbit/s, preferably between 100 kbit/s and 10 Gbit/s, more preferably between 100 kbit/s and 200 Mbit/s. Preferably, the symbol rate of the input signal may be smaller than the symbol rate of the optical carrier signal at least by a factor of 2, more preferably at least by a factor of 10.

Obtaining an input signal indicating the period of the copropagating optical signal may allow using techniques that are less sophisticated than the techniques required for determining the distortion of the carrier signal caused by the periodic component thereof at the optical receiver without having any previous knowledge about the copropagating optical signal, since the period does not have to be indirectly determined, computed, or estimated. The precise "shape" of the periodic copropagating optical signal needs not be known a priori or be included in the input signal. "Shape" refers herein to the waveform of a signal, that is, to the value of the amplitude and/or phase as a function of time.

Notably, the original shape or waveform of the distorting signal may be different to the shape or waveform of a periodic component of the distorted carrier signal received at the optical receiver. This is for example due to the fact that, when the carrier signal and the copropagating optical signal copropagate in an optical fiber, the strength of an optical interaction between both signals may decrease with increasing propagation distance over the optical fiber as a consequence of fiber attenuation and as the power of the signals decreases. FIG. 3 illustrates an exemplary situation. During propagation in an optical fiber 12, the strength 206 of nonlinear optical interactions between an optical carrier signal 80 and an copropagating optical signal 86 decreases with increasing propagation distance over the fiber 12 (from left to right in the figure) due to fiber attenuation, thereby decreasing signal power. Considering small sections 200 of infinitesimal length Δz of the fiber 12, contributions to the overall signal distortions may be larger for sections Δz of the fiber 12 located closer to the fiber input (i.e. on the left hand side of the figure) than for sections Δz of the fiber 12 of identical length located further away from the fiber input (i.e. on the right hand side of the figure). Furthermore, the shape of the contribution within such a small section Δz of the fiber 12 may depend on the actual waveform of the disturbing signal within said section. Waveform variations of the disturbing signal during propagation are governed by effects such as chromatic dispersion and SPM, wherein their extent may depend on the properties and type of the optical fiber 12. A single pulse of the optical copropagating optical signal, for example an OTDR pulse, launched into the fiber 12 may broaden with increasing fiber distance (i.e. from left to right in the illustration shown in FIG. 3) while the edges of the pulses may become smoother. As a consequence, the waveform of the disturbing copropagating optical signal 86 may be different several kilometers down the fiber 12 from the waveform of the same signal at the fiber input.

In addition, since signal components having different wavelengths may have different group velocities, the copropagating optical signal 86 and the optical carrier signal 80 may propagate over the fiber 12 with different group velocities. This may be better understood by considering a pulse of the copropagating optical signal 86 represented by a an optical power peak, as illustrated in the lower sub-diagrams in FIG. 3. Due to the different group velocities, the optical carrier signal 80 and the disturbing copropagating optical signal 86 may be time-shifted with respect to each other, such that a time shift 202 may arises and cause the peak corresponding to the same pulse of the copropagating optical signal 86 affect different parts 204 of the optical carrier signal 80 across the optical fiber 12.

As a consequence, the waveform or shape of the distortions in the optical carrier signal 80 (e. g phase variations induced by SPM) may be different from the waveform or shape of the disturbing copropagating optical signal as launched into the transmission fiber. This is the so-called "walk-off effect", which has a similar effect as a low-pass filter. In combination with the decrease of the strength of the nonlinear interaction, the shape of the signal distortions induced by the copropagating optical signal 86 upon the optical carrier signal 80 may be asymmetric even if the pulses of the copropagating optical signal 86 launched into the transmission fiber are symmetric. For example, the asymmetric shape of the signal distortion shown in FIG. 2 may result from a symmetric rectangular pulse of a copropagating optical signal 86 launched into a transmission fiber 12. However, the present inventor realised that all these effects do not noticeably affect the periodic behaviour of the distortions induced by a periodic copropagating optical signal 86 upon an optical carrier signal 80. Consequently, the period of the distortions induced by the copropagating optical signal 86 upon the optical carrier signal 80 and the period of the copropagating optical signal 86 itself may be assumed to be equal.

In some preferred embodiments of the invention, determining the period of the periodic component of the distorted optical carrier signal may comprise modelling the optical carrier signal or parts thereof by means of an analytical and/or numerical model. The model may be a Bayesian-probabilistic model and determining the period of the periodic component of the optical carrier signal may comprise using the Gregory and Loredo algorithm (cf. P. C. Gregory and T. J. Loredo, "A new method for the detection of a periodic signal of unknown shape and period", Astrophysical Journal, vol. 398, no. 1, October 1992, p. 146-168).

Gregory and Loredo address the problem of detecting a periodic signal in astronomical data. The objection is the detection of X-ray pulsars and the data are the arrival times of individual X-ray photons. In general, no prior knowledge of the existence and the characteristics of the periodic signal is available, and detecting the periodic signal may be difficult because of additive noise.

One of the objects of the present application is to detect a periodicity in the distortions present in an optical carrier signal received at a receiver in order to be able to remove such distortions from the received signal, and thereby achieve an improved transmission performance. During propagation in an optical fiber, optical signals may suffer from distortions that are directly linked to the received signal such as group-velocity distortion (GVD) and self-phase modulation (SPM), and that can be considered deterministic in view of the received signal. Such distortions can be at least partially removed from the received signal by appropriate signal processing algorithms. Further, optical signals may also be affected by other distortions caused by additive noise and/or from copropagating optical signals that copropagate in the fiber with other optical signals (the optical carrier signal).

Signal distortions in an optical carrier signal caused by a copropagating optical signal may be related to the waveform of the copropagating optical signal, but they may nevertheless appear to be random when detected or monitored at an optical receiver due to the absence of directly perceivable regular patterns, like e.g., periodicities. It has been shown that distortions caused by copropagating signals transporting uncorrelated data can be well modeled as Gaussian noise when using coherent detection (cf. P. Poggiolini, "The GN model of non-linear propagation in uncompensated coherent systems", Journal of Lightwave technology, vol. 30, no. 24, December 2012, P. 3857-3879). The present inventor realised that some of these mathematical techniques employed in the field of astronomy can be advantageously applied in combination with the fact that periodic copropagating signals cause periodic distortions in the field of optical communications.

The technique developed by Gregory and Loredo comprises two steps that make both use of Bayes' theorem, namely detection of a periodic signal and estimation of the characteristics of this periodic signal. The technique is based on detecting a signal based on Bayesian theory by comparing a model for a signal without periodic structure with members of a class of models with periodic structure, wherein global likelihoods are assigned to the various models. In order to apply such a model in the field of optical communication in the context of the present invention, the present inventor proposes calculating the global likelihoods for Gaussian noise and stepwise functions. For the estimation of the model parameters such as frequency and of the shape of the periodic structure, the posterior distribution of the model parameters may be calculated. The algorithm is disclosed in detail in a manner accessible to the skilled person in the aforementioned article by Gregory and Loredo. The present inventor further realised that the algorithm presented by Gregory and Loredo may be used in a simplified manner in the field of optical communication in the context of the present invention if the value of the period of the periodic component of the periodic part of the received signal is known beforehand.

Notably, while the Gregory and Loredo algorithm is a possible method that may be used for determining the period and/or the shape or waveform of the periodic component of the optical carrier signal without having any previous knowledge about the characteristics of the copropagating optical signal, the invention is not limited thereto, and any other equivalent mathematical methods or algorithms may be used for the purposes of the present invention.

According to preferred embodiments of the invention, determining the periodic distortion of the distorted optical carrier signal caused by the copropagating optical signal may comprise measuring a plurality of distortions of the carrier signal, wherein each measurement may correspond to a time length equal to the determined period of the periodic component of the distorted optical carrier signal, and averaging over the plurality of measurements. In some embodiments, the plurality of measurements may comprise 5 or more measurements, 10 or more measurements, 50 or more measurements or 100 or more measurements. Thus, the overall averaging time, i.e. the overall time over which measurements are included in the averaging, may correspond, accordingly, to 5 times or more, 10 times or more, 50 times or more, or 100 times or more the period of the copropagating optical signal. As previously mentioned, the periodic distortion of the carrier signal may correspond to a periodic phase variation of the carrier signal.

For example, the copropagating optical signal may comprise a copropagating OTDR signal comprising a plurality of OTDR pulses. The periodic phase variation of the carrier signal caused by the periodic component of the copropagating optical signal can then be determined by measuring the phase variation of the carrier signal received at the optical receiver caused by each pulse of a sequence of OTDR pulses and then averaging over the measurements. The measurement interval of each of the measurements may be set equal to the period of the copropagating optical signal. Averaging over the phase measurements obtained for different pulses yields an averaged measurement of the phase variation of the carrier signal caused by a single OTDR pulse. An example thereof is illustrated in FIG. 2. Notably, the beginning of the different measurements of the OTDR pulses need not coincide with any particular phase value thereof, e.g., need not coincide with the "beginning", or any other particular phase value, of the OTDR pulses. The measurement corresponds to the frequency shift caused by the copropagating optical signal. Notably, clock recovery is not necessary for this averaging. In some embodiments, each measurement may correspond to a time length equal to a multiple of the determined period of the periodic component of the distorted optical carrier signal, in which case, the measurement may yield phase variations of the carrier signal caused, correspondingly, by more than one OTDR pulses.

According to preferred embodiments of the invention, the method may further comprise storing information about the compensation signal. Storing information about the compensation signal may allow reusing the same compensation signal without having to determine it anew when distortions can be expected or are known to be present that are equal or at least very similar to the distortions for which the compensation signal has been generated, as is usually the case in the presence of periodic distorting signals. For example, if the compensation signal is generated to compensate the distortion caused by an OTDR pulse, the stored information may be used to generate a compensation signal for subsequent OTDR pulses without having to repeat the processes of determining a period and a periodic phase variation. The aforesaid information about the compensation signal may in particular comprise information about the period, the amplitude, and/or the shape of the compensation signal. The information about the compensation signal may be stored in any kind of storage device.

In preferred embodiments of the invention, the method may further comprise generating pulses of the copropagating optical signal having a predefined period. The pulses of the copropagating optical signal may then be generated in a controlled manner so that they have the predefined period. The predefined period may then be transmitted to the optical receiver and be used for determining the distortion of the carrier signal caused by the periodic component thereof as explained above.

In some preferred embodiments of the invention, the copropagating optical signal causing signal distortions upon the optical carrier signal may be subsequently activated and deactivated, such that the copropagating optical signal is active for a limited time and is activated repeatedly.

In some preferred embodiments of the invention, the method may further comprise emitting a trigger pulse before emitting a sequence of pulses of the copropagating optical signal, and inferring from the trigger pulse that the sequence of pulses of the copropagating optical signal is going to be received by at the optical receiver and/or that the optical carrier signal to be received at the optical receiver is distorted by the sequence of pulses of the copropagating optical signal. The trigger signal may for example correspond to a pulse of the copropagating optical signal having amplitude smaller or greater than the amplitude of the pulses of the sequence of pulses of the copropagating optical signal that are subsequently emitted. The trigger signal may allow signalling to the optical receiver that it should be ready for detection so as to detect the sequence of pulses.

In preferred embodiments of the invention, generating pulses of the copropagating optical signal may comprise generating a first sequence of pulses of the copropagating optical signal with a first optical power before emitting a second sequence of pulses of the copropagating optical signal with a second optical power, wherein the first optical power is smaller than the second optical power. The first sequence needs not be intended for determining accurate fiber characteristics and/or for obtaining a fully effective compensation signal but may instead be used to allow obtaining the right phase variation caused by a single pulse of the copropagating optical signal at the optical receiver. Distortions are typically proportional to the optical power of the distorting signal, in this case the copropagating optical signal. Thus, due to the reduced optical power, the phase variation obtained for the first sequence of pulses is smaller than the phase variation that will be caused by the pulses of the second sequence of pulses.

The method may further comprise compensating distortions caused by the pulses of the second sequence of pulses by scaling a first compensation signal determined for the pulses of first sequence of pulses by a scaling factor, wherein the scaling factor corresponds to a ratio of the second optical power to the first optical power or is a function thereof. This allows applying to the second sequence of pulses an appropriate compensation signal from the beginning, avoiding compensation errors at the optical receiver that may result from bad averaging for an initial part of a sequence of pulses. The first sequence of pulses is emitted at a reduced power level and is hence causing less detection errors, such as bit errors. The phase variation caused by the pulses of the second sequence of pulses can be obtained from the compensation signal obtained for the first sequence of pulses by scaling, wherein the scaling factor corresponds to a ratio of the second optical power to the first optical power.

Preferably, the first optical power may be at least 2 times smaller than the second optical power, preferably at least 4 times smaller than the second optical power, more preferably at least 8 times smaller than the second optical power.

According to preferred embodiments of the invention, generating pulses of the copropagating optical signal may comprise progressively increasing the optical power of a sequence of pulses of the copropagating optical signal for a ramp up time at the beginning of said sequence of pulses. This may allow avoiding or at least reducing undercompensation at the beginning of a sequence of pulses of the copropagating optical signal due to incomplete averaging.

Preferably, the ramp up time may at least be equal to the averaging time, wherein the averaging time corresponds to the product of the number of pulses used for averaging and the time distance between two successive pulses (i.e. the period). More preferably, the ramp up time may be at least equal to 0.1, 0.5, 1.0, 1.5, 2.5, 5 or 10 times an averaging time corresponding to the product of the number of pulses used for averaging and the time distance between two successive pulses.

Additionally or alternatively, the ramp up time may be at least 1/10 of a measurement sequence time, preferably at least equal to the measurement sequence time, more preferably at least 10 times the measurement sequence time and/or to a time between the beginning and the end of a sequence of pulses of the copropagating optical signal having a power equal to at least 90% of a maximum power of said sequence. The measurement sequence time corresponds to the time between the beginning and the end of a sequence of pulses of the copropagating optical signal.

Preferably, the measurement sequence time may be at least 5 times the period of the copropagating optical signal, preferably at least 20 times the period of the copropagating optical signal, more preferably at least 100 times the period of the copropagating optical signal.

Additionally or alternatively, generating pulses of the copropagating optical signal may comprise, in further embodiments of the invention, progressively decreasing the optical power of a sequence of pulses of the copropagating optical signal for a ramp down time at the end of said sequence of pulses. This allows avoiding or at least reducing overcompensation at the end of a sequence of pulses of the copropagating optical signal due to incomplete averaging. Preferably, the ramp down time may be at least equal to 0.1, 0.5, 1.0, 1.5, 2.5, 5 or 10 times an averaging time corresponding to the product of the number of pulses used for averaging and the time distance between two successive pulses. Preferably, the ramp down time may be at least 1/10 of a measurement sequence time, preferably at least equal to the measurement sequence time, more preferably at least 10 times the measurement sequence time and/or to a time between the beginning and the end of a sequence of pulses of the copropagating optical signal having a power equal to at least 90% of a maximum power of said sequence.

In some preferred embodiments of the invention, the copropagating optical signal may be a codirectional or counterdirectional optical time domain reflectometry signal. In other embodiments, the copropagating optical signal may be a codirectional or counterdirectional optical supervisory channel signal.

A further aspect of the invention relates to a readable storage medium comprising executable instructions which, when executed by a processor, cause the processor to carry out the method of any of the embodiments of the invention described above to compensate signal distortions induced in the optical carrier signal by a periodic copropagating optical signal. Such a readable storage medium may allow for a software-based implementation of the method of the invention.

A further aspect of the invention concerns a signal processing unit configured to implement the method according to any of the embodiments of the invention described above to compensate signal distortions induced in the optical carrier signal by a periodic copropagating optical signal. The signal processing unit may be integrated in an optical system, for example in an optical receiver, and/or may be connected or connectable to such an optical receiver and/or optical system, A signal processing unit according to the invention may allow for a hardware-based and/or software-based implementation of the method of the invention.

In particular, the signal processing unit may be configured for compensating signal distortions in the optical carrier signal received by an optical receiver to which the signal processing unit is connectable or connected caused by a periodic copropagating optical signal, wherein the optical carrier signal and the copropagating optical signal copropagate in at least a part of an optical path connected or connectable to the optical receiver. The signal processing unit may be configured for determining a period of a periodic component of the distorted optical carrier signal, determining a periodic distortion of the distorted optical carrier signal caused by the copropagating optical signal, and generating a compensation signal to correct the distorted optical carrier signal according to the determined periodic distortion. The periodic distortion may comprise a phase variation of the distorted optical carrier signal. The optical system of the invention may correspond to an optical receiver or to an optical network. In some embodiments, determining the periodic distortion of the distorted optical carrier signal may comprise determining the periodic distortion of the distorted optical carrier signal based on the determined period, but this is not necessarily the case.

A further aspect of the invention concerns an optical system comprising an optical receiver for receiving an optical carrier signal, wherein the optical receiver comprises the aforesaid signal processing unit, wherein the signal processing unit is configured for compensating to signal distortions in the optical carrier signal caused by a periodic copropagating optical signal, wherein the optical carrier signal and the copropagating signal copropagate in at least a part of an optical path connected or connectable to the optical system. The optical system of the invention may be or comprise the optical receiver, but it may also comprise further optical elements and/or equipment, and may be integrated in an optical network comprising one or more network nodes and/or network elements.

The present invention further refers to a copropagating optical emitter for emitting the copropagating optical signal having a predefined period. The copropagating optical emitter may be comprised in an optical device other than the optical receiver. For example, the optical receiver may be comprised in a first network element and the copropagating optical signal emitter may be comprised in a second network element, said second network element being optically connected or connectable to the optical receiver.

According to preferred embodiments of the invention, the copropagating optical signal emitter may be configured to transmit an input signal to the signal processing unit of the optical receiver indicating the predefined period of the copropagating optical signal, and the signal processing unit of the optical receiver may further be configured for determining the period of the periodic component of the distorted optical carrier signal based on the received input signal. The input signal may have a data rate of between 1 kbit/s and 1 Tbit/s, preferably between too kbit/s and to Gbit/s, more preferably between 100 kbit/s and 200 Mbit/s. Preferably, the symbol rate of the input signal may be at least by a factor of 2, preferably at least by a factor 5, more preferably at least by a factor to, smaller than the symbol rate of the optical carrier signal. In case of binary modulation, the symbol rate may be identical to the bit rate.

In some preferred embodiments of the invention, the signal processing unit may further be configured for determining the period of the periodic component of the distorted optical carrier signal by modelling the optical carrier signal or parts thereof by means of an analytical and/or numerical model. Preferably, said model may be a Bayesian-probabilistic model, like the Gregory and Loredo algorithm.

In preferred embodiments of the invention, the signal processing unit may further be configured for determining the periodic distortion of the distorted carrier signal caused by the copropagating optical signal by using a Viterbi-Viterbi phase recovery technique.

According to preferred embodiments of the invention, the signal processing unit may further be configured for determining the periodic distortion of the distorted carrier signal caused by the periodic component of the distorted optical carrier signal by measuring a plurality of distortions of the distorted carrier signal, wherein each measurement corresponds to a time length equal to the determined period of the periodic component of the distorted carrier signal, and by averaging over the plurality of measurements.

According to preferred embodiments of the invention, the copropagating optical signal emitter may be configured for emitting a trigger pulse before emitting a sequence of pulses of the copropagating optical signal, and wherein the optical receiver is further configured for inferring from the trigger pulse that the optical carrier signal to be received at the optical receiver is distorted by the sequence of pulses of the copropagating optical signal copropagating optical signal.

The copropagating optical signal emitter may be configured, in some preferred embodiments, for emitting a first sequence of pulses of the copropagating optical signal with a first optical power before emitting a second sequence of pulses of the copropagating optical signal with a second optical power, wherein the first optical power is smaller than the second optical power. A time interval between the first and second sequences of pulses may be larger than the predefined period, preferably at least five times larger than the predefined period, more preferably at least ten times larger than the predefined period.

In some embodiments, the signal processing unit may be further configured for compensating distortions caused by the pulses of the second sequence of pulses by scaling a first compensation signal determined for the pulses of first sequence of pulses by a scaling factor, wherein the scaling factor corresponds to a ratio of the second optical power to the first optical power or is a function thereof. That is, a first compensation signal is generated by the signal processing unit for compensating distortions in the pulses of the first sequence of pulses and a second compensation signal is generated by the signal processing unit for compensating distortions in the pulses of the second compensation signal, wherein the second compensation signal is obtained by scaling the first compensation signal.

Preferably, the first optical power may be at least 2 times smaller than the second optical power, preferably at least 4 times smaller than the second optical power, more preferably at least 8 times smaller than the second optical power.

The copropagating optical signal emitter may be configured, in some preferred embodiments, to progressively increase the optical power of a sequence of pulses of the copropagating optical signal for a ramp up time at the beginning of said sequence of pulses. Preferably, the ramp up time may be at least equal to 0.1, 0.5, 1.0, 1.5, 2.5, 5 or 10 times an averaging time corresponding to the product of the number of pulses used for averaging and the time distance between two successive pulses.

In preferred embodiments of the invention, the copropagating optical signal emitter may further be configured to progressively decrease the optical power of a sequence of pulses of the copropagating optical signal for a ramp down time at the end of said sequence of pulses. Preferably, the ramp down time may be is at least equal to 0.1, 0.5, 1.0, 1.5, 2.5, 5 or 10 times an averaging time corresponding to the product of the number of pulses used for averaging and the time distance between two successive pulses.

According to preferred embodiments of the invention, the system may further comprise a storage device, and the signal processing unit may further be configured for storing the generated compensation signal into the storage device and for using the stored compensation signal for compensating subsequent carrier signals that are distorted by the same or a similar copropagating optical signal. The storage device may for example be an internal storage device comprised in the optical receiver or an external storage device connectable to the receiver.

In some preferred embodiments of the invention, the copropagating optical signal emitter may comprise an OTDR device and the copropagating optical signal may be a codirectional OTDR signal.

In preferred embodiments of the invention, the optical system may comprise a copropagating optical emitter according to any of the previously described embodiments, wherein the copropagating optical emitter is optically connected to the optical receiver.

In further preferred embodiments, the optical receiver and the copropagating signal emitter may be integrated in the same network node or network element. Such a network node or network element may hence be configured for compensating, by the optical receiver integrated therein, signal distortions caused by a copropagating optical signal, wherein the copropagating optical signal may be received from an external network element or network node, for example from an external copropagating optical signal emitter located upstream from the network element or network node, and for emitting, by the copropagating signal emitter integrated therein, a further copropagating optical signal to a further optical receiver, for example to a further optical receiver located downstream from the network element or network node.

In further preferred embodiments, the aforesaid network node or network element may further comprise a second copropagating optical emitter for emitting a second copropagating optical signal having the predefined period, wherein the second copropagating optical signal can be received by a further optical receiver comprised in the optical system located downstream from the network node or network element, i.e. at another network node or network element of the system.

For example, the optical system may correspond to an optical network comprising a plurality of network elements, wherein at least one of the network elements comprises an optical receiver and/or a copropagating optical signal emitter according to the invention. A network element or a network node comprising both an optical receiver and a copropagating optical signal emitter can be configured both for compensating signal distortions in an optical carrier signal received from one of the other network elements or network nodes of the optical system, which may be located upstream from the network element or a network node, and for generating and emitting a second copropagating optical signal to another one of the other network elements or network nodes of the optical system, which may be located downstream from the network element or a network node. The second copropagating optical signal may have the predefined period, i.e. the same period as the copropagating optical signal. The copropagating optical signal emitter and the second copropagating optical signal emitter may be configured to operate simultaneously or one at a time.

BRIEF DESCRIPTION OF THE DRAWINGS

FIG. 1 shows constellation diagrams illustrating the effects of distortion by a periodic copropagating optical signal for different strengths of nonlinear interaction.

FIG. 12 shows a schematic illustration representing two methods of signal compensation according to respective embodiments of the invention (FIGS. 12a and 12b).

FIG. 18 is an illustration of periodic signal distortions of an 8QAM signal.

DETAILED DESCRIPTION OF PREFERRED EMBODIMENTS OF THE INVENTION

Figure 2:
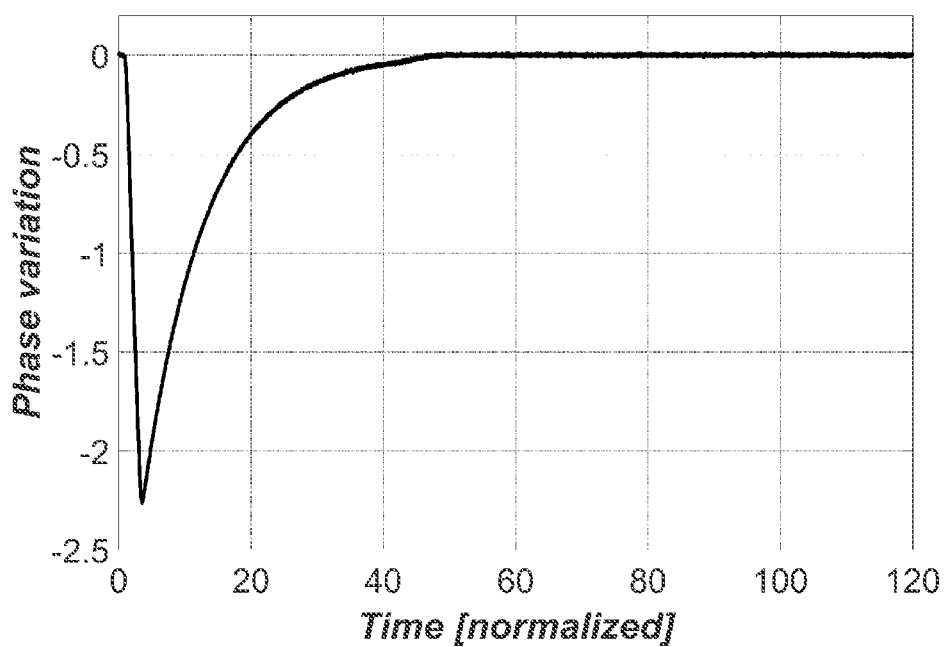
FIG. 2 shows an averaged measurement of the phase variation caused by a periodic copropagating optical signal on the optical carrier signal.
Figure 3:
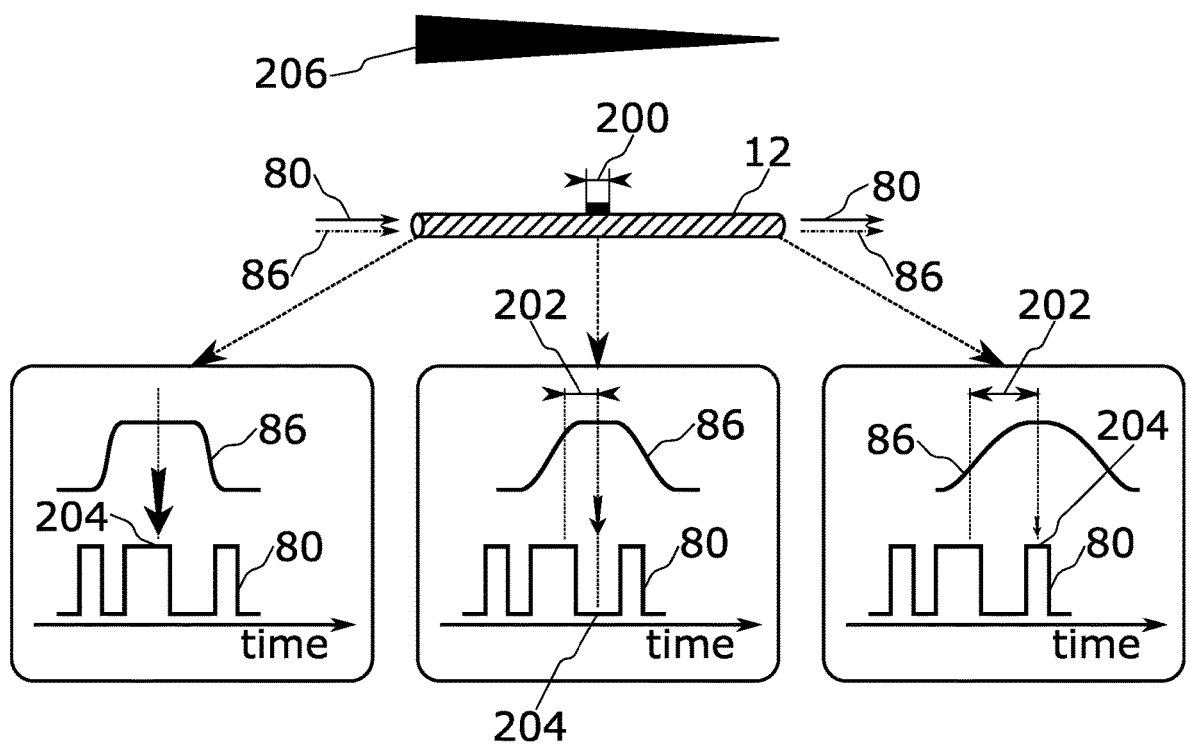
FIG. 3 is an illustration of the walk-off effect in an optical system according to some embodiments of the invention.

For the purposes of promoting an understanding of the principles of the invention, reference will now be made to preferred embodiments illustrated in the drawings, and specific language will be used to describe the same. It will nevertheless be understood that no limitation of the scope of the invention is thereby intended, and that such alterations and further modifications of the illustrated embodiments as well as further applications of the principles of the invention illustrated herein are contemplated as would normally occur now or in the future to one skilled in the art to which the invention relates.

FIG. 1 illustrates four constellation diagrams of four exemplary respective optical signals with QPSK modulation and signal distortions induced thereon by a periodic copropagating optical signal. All signals are affected by additive noise with identical probability distribution. However, the strength of the nonlinear interaction increases from FIG. 1a to FIG. 1d, as illustrated in the figure. The distortions caused by the periodic copropagating optical signal are visible as a nose or bulge in the constellation diagrams resulting from a phase shift or phase variation of the signals induced by the periodic copropagating optical signal. This kind of phase reduction is characteristic of periodic distorting signals.

The present invention refers to a method and an optical system suitable for compensating, at an optical receiver of an optical system, signal distortions induced in an optical carrier signal by a periodic copropagating optical signal. The optical carrier signal is received at the optical receiver.

Figure 4:
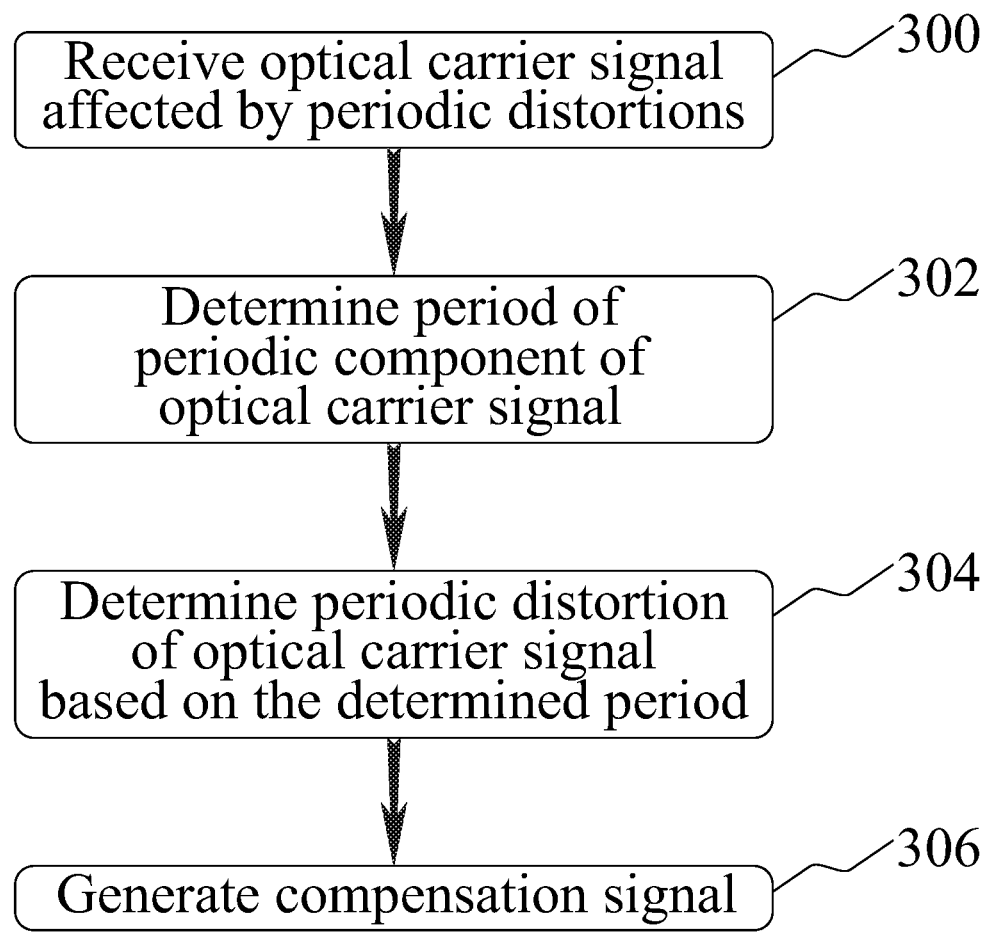
FIG. 4 is a flow diagram illustrating a method according to an embodiment of the invention.
Figure 5:
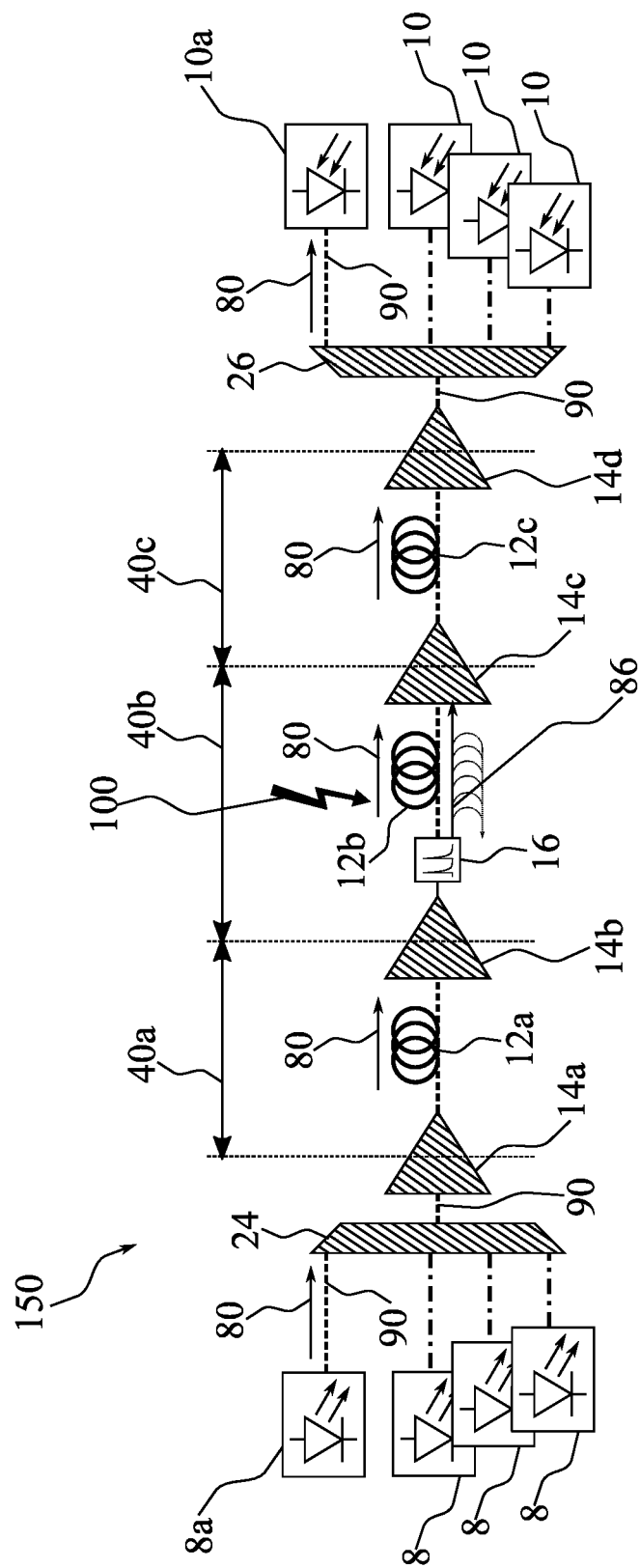
FIG. 5 shows an optical system according to an embodiment of the invention.
Figure 6:
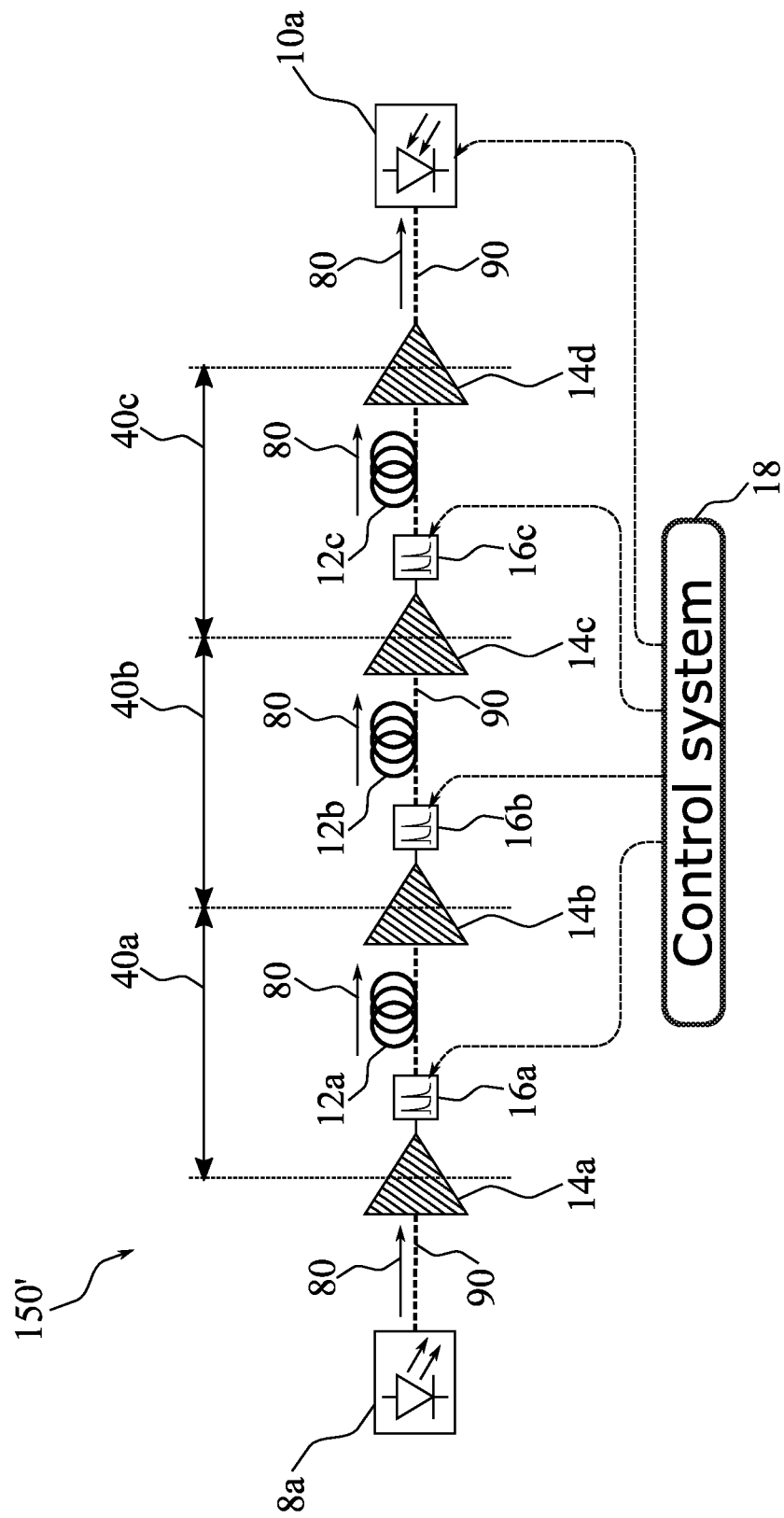
FIG. 6 shows an optical system according to another embodiment of the invention.

FIG. 4 shows a schematic diagram illustrating a method according to an embodiment of the invention. FIGS. 5 and 6 show schematic diagrams of optical systems 150 and iso' according to embodiments of the invention. Preferred embodiments of the invention will be now described in a manner that may be best understood by a simultaneous consideration of FIG. 4 on the one side and of FIGS. 5 and 6 on the other side.

FIG. 5 illustrates a schematic representation of an optical system 150 that comprises a plurality of optical transmitters 8, 8a connected to a multiplexer 24, wherein the optical signals outputted by each of the optical transmitters 8, 8a are multiplexed by the multiplexer 24 and transmitted through a first optical fiber 12a in a first span 40a, a second optical fiber 12b in a second span 40b, and a third optical fiber 12C in a third span 40c, before arriving at a demultiplexer 26 that demultiplexes the different channels transmitted through the optical fiber spans 40a, 40b, and 40c and transmits them to respective optical receivers 10, boa.

A first optical amplifier 14a is connected between the multiplexer 24 and the first optical fiber span 40a. A second optical amplifier 14b is connected between the first and second optical fiber spans 40a and 40b and a third optical amplifier 14c is connected between the second and third optical fiber spans 40b and 40c. A fourth optical amplifier 14d is connected between the third span 40c and the demultiplexer 26.

An optical carrier signal 80 is emitted at an emitting end by the optical transmitter 8a. The optical carrier signal 80 is transmitted over an optical path 90 through the multiplexer 24, the spans 40a to 40c, and the demultiplexer 26 to an optical receiver boa. During the transmission, the carrier signal 80 copropagates with a periodic copropagating optical signal 86 within the span 40b, which is emitted into the optical fiber 12b by an OTDR device 16 for monitoring purposes. The copropagating optical signal 86 induces a distortion 100 upon the carrier signal 80, such that when the carrier signal 80 reaches the optical receiver boa, the carrier signal 80 is distorted by the copropagating optical signal 86. However, in the embodiment shown, the amplifiers 14c and 14d are configured to amplify at wavelengths different to a wavelength of the copropagating optical signal 86 and, as a consequence, the copropagating optical signal 86 is not received at the optical receiver boa.

The method of FIG. 4 comprises a step 300 of receiving, at an optical receiver, for example the optical receiver boa shown in FIG. 5, an optical carrier signal 80, wherein the optical carrier signal is distorted by the copropagating optical signal 86 within span 40b, in which the carrier signal 80 and the copropagating optical signal 86 copropagate as part of a combined signal.

Figure 10:
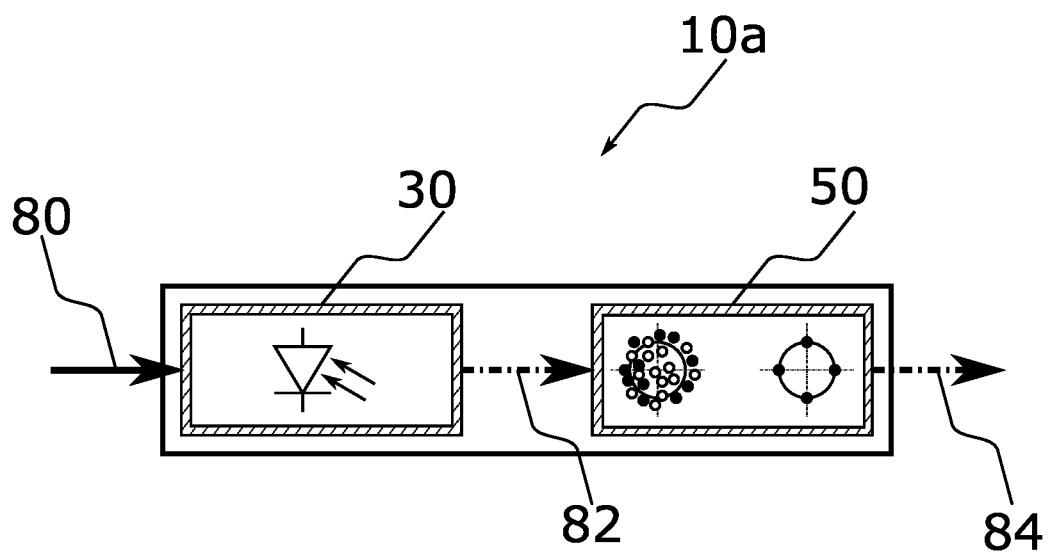
FIG. 10 is a high-level illustration of an optical receiver according to an embodiment of the invention.

A more detailed representation of an optical receiver boa according to an embodiment of the present invention is illustrated in FIG. 10. The optical receiver boa comprises an optical front end 30 that is configured for receiving the optical carrier signal 80 and for transforming information encoded in the optical carrier signal 80 into an electrical detection signal 82 that is transmitted to a signal processing unit 50 of the optical receiver boa. The signal processing unit 50 can comprise digital signal processors (DSPs), field programmable gate arrays (FPGAs), application-specific integrated circuits (ASICs), central processing units (CPUs), integrated circuits, or any other equipment or electronic components necessary for receiving the electrical detection signal 82 and processing it according to the functionalities of the signal processing unit 50 described herein.

The signal processing unit 50 of the optical receiver ma is configured for compensating signal distortions in the optical carrier signal 80 caused by the copropagating optical signal 86. The signal processing unit 50 of the optical receiver ma shown in FIG. 5 is coupled to the optical path 90 via the optical front end 30 and is suitable for receiving the carrier signal 80 transmitted therethrough.

The signal processing unit 50 is configured for determining a period of a periodic component of the optical carrier signal 80, which copropagates in the span 40b with the periodic copropagating optical signal 86, corresponding to a subsequent step 302 of the method shown in FIG. 4. In the embodiment shown, no information about a period of the copropagating optical signal 86 is available at the optical receiver 10a a priori, such that the period of the period of the copropagating optical signal 86 is not known a priori at the optical receiver 10a. The signal processing unit 50 is configured for determining the period of the periodic component of the optical carrier signal 80 using the algorithm developed by Gregory and Loredo in the manner described above.

The signal processing unit 50 of the optical receiver 10a is further configured for determining a periodic distortion of the carrier signal 80 caused by the copropagating optical signal 86 based on the determined period of the periodic component of the optical carrier signal 80, corresponding to a subsequent method step 304 of the method illustrated in FIG. 4. In particular, the signal processing unit 50 of the optical receiver 10a of the exemplary embodiment of FIGS. 4 and 10 is configured for determining a periodic phase variation of the carrier signal 80 caused by the copropagating optical signal 86 based on the Viterbi-Viterbi phase recovery technique. Notably, the periodic distortion of the carrier signal 80 caused by the copropagating optical signal 86 needs not always be determined based on the determined period of the periodic component of the optical carrier signal 80.

In addition, the signal processing unit 50 of the optical receiver 10a is configured for measuring a plurality of phase variations of the carrier signal 80 wherein each measurement corresponds to a time length equal to the period of the periodic component of the optical carrier signal 80 that has been determined in method step 302, and for averaging over the plurality of measurements. This allows cancelling out the contribution of additive noise. The result of the averaging can be a trace of phase variation against time as the one shown in FIG. 2.

The signal processing unit 50 of the optical receiver ma is further configured for generating a compensation signal to correct the optical carrier signal 80 and/or an electrical signal corresponding to the optical carrier signal 80, e.g., the electrical detection signal 82, according to the determined periodic phase variation, i.e. according to the average of the plurality of measurements shown in FIG. 2. In the embodiment shown, the compensation signal generated by the signal processing unit 50 can be an electrical or digital signal that is combined by the signal processing unit 50 with the electrical detection signal 82 to generate an output signal 84 corresponding to the compensated carrier signal, in which the distortions caused by the copropagating optical signal 86 upon the carrier signal 80 are compensated. Thus, by combining the generated compensation signal with a direct measurement of the optical carrier signal 80, a distortion in the optical carrier signal caused by the copropagating optical signal can be compensated by the signal processing unit 50.

The distortions caused by the periodic copropagating optical signal 86 on the optical carrier signal 80 can thereby be eliminated, or at least reduced, according to the principles of the present invention by periodically applying a compensating phase variation corresponding to the average over the plurality of measurements obtained in step 304, i.e. corresponding to a repeated phase variation like the one represented in FIG. 2. "Periodically" refers herein to the period of the periodic part of the optical carrier signal 80, which coincides with the period of the corresponding periodic distortions of the optical carrier signal 80.

Figure 9:
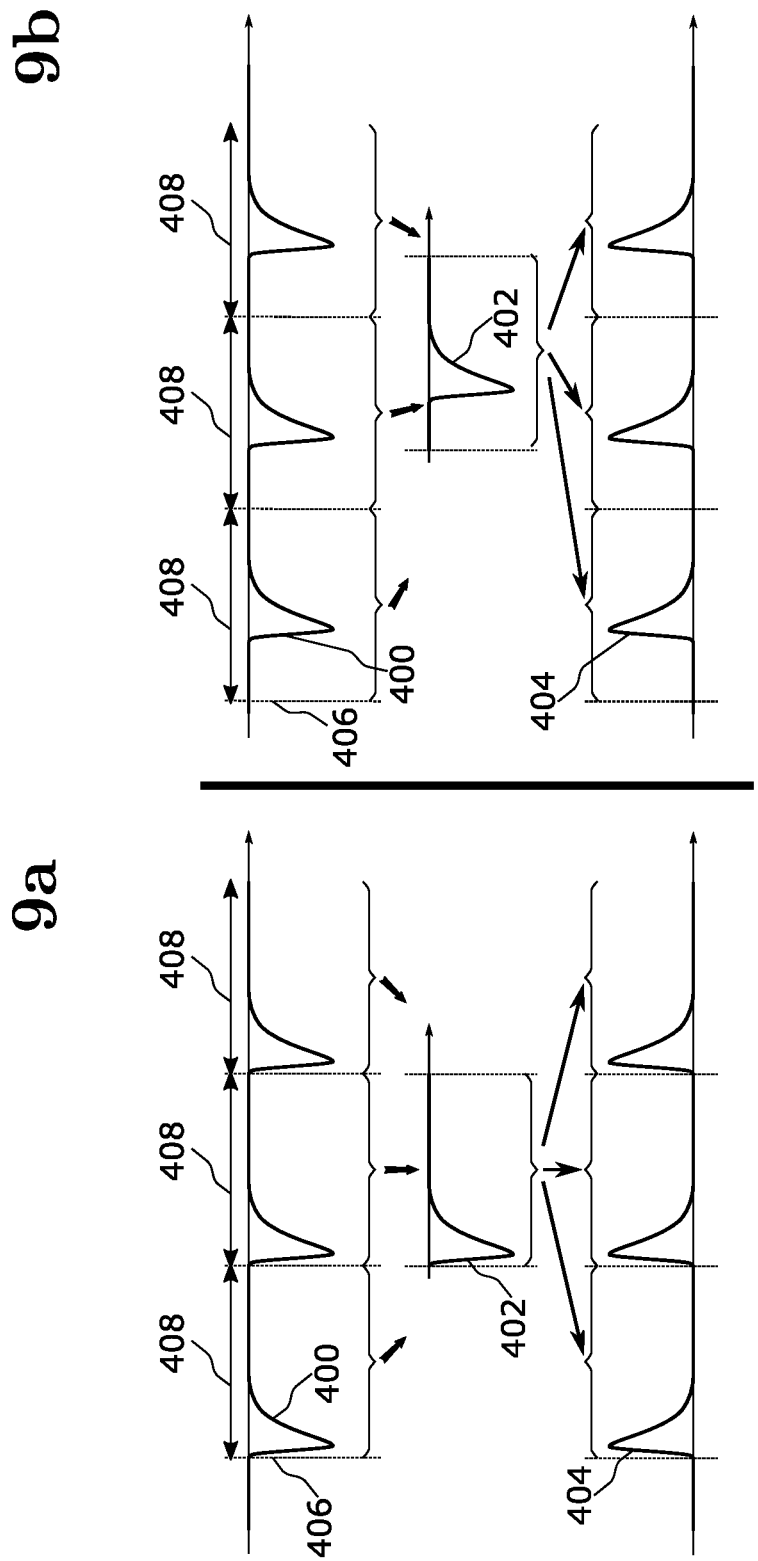
FIG. 9 is an illustration of the averaging in a method according to an embodiment of the invention.

A first clock signal may be used for encoding data in the optical carrier signal 80. Since the periodic distortions induced by the copropagating optical signal 86 upon the optical carrier signal 80 might not be aligned or coordinated with the first clock signal, the method of compensating signal distortions according to the present invention, in particular method steps 300 to 306 illustrated in FIG. 4, may be carried out using a second clock signal independent from the first clock signal. The second clock signal may be provided by a clock unit operating at a frequency corresponding to the period of the periodic copropagating optical signal, which corresponds to the period of the distortions in the optical carrier signal 80. Notably, the second clock signal needs not have any particular phase relationship with respect to the copropagating optical signal 86, the periodic distortions or the periodic component of the optical carrier signal 80, as will be better explained with reference to FIG. 9.

FIGS. 9a and 9b compare the step 306 of the method illustrated in FIG. 4 of generating the compensation signal 404 for different phase relationships 406 of the aforesaid second clock signal with respect to the compensation signal 404. The second clock signal has a period corresponding to the period of the periodic component of the optical carrier signal determined in method step 302 of FIG. 4. The waveform 402 of the compensation signal 404 that is to be periodically repeated for compensating the distortions in the optical carrier signal is determined by measuring a plurality of distortions of the optical carrier signal (three are exemplary shown in each of FIGS. 9a and 9b), wherein each measurement corresponds to a time length equal to the period of the second clock signal, i.e. to the determined period of the periodic component of the optical carrier signal, and averaging over the plurality of measurements.

The different phase relationships 406 of the aforesaid second clock signal with respect to the compensation signal 404 of the examples shown, respectively, in FIGS. 9a and 9b, are illustrated as the different time-positions of the measurements (uppermost row in each of FIGS. 9a and 9b) and the peaks of the compensation signal 404 (lowest row in each of FIGS. 9a and 9b) within each of the time slots corresponding to different periods. As seen in the figures, the peaks corresponding to the generated compensation signal 404 are, both in the example of FIG. 9a and in the example of FIG. 9b, aligned with the peaks corresponding to the measured distortions. Notably, no synchronisation of the compensation signal 404 with the aforementioned first clock signal used for encoding data in the optical carrier signal 80 is required, and an absolute time-shift of the initial time of each measurement with respect to the periodic distortions needs not correspond to any particular value.

Figure 11:
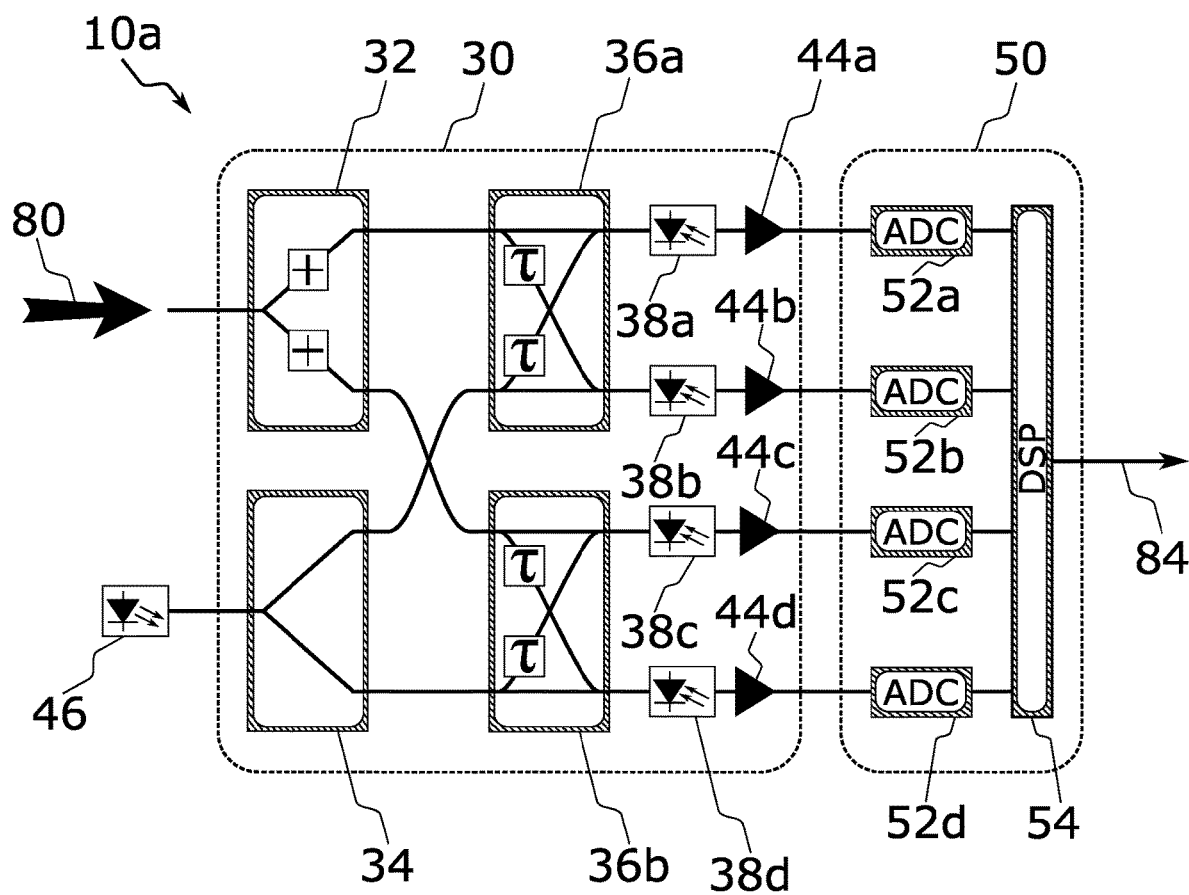
FIG. 11 is an illustration of an optical receiver according to an embodiment of the invention.

The internal structure of the optical front end 30 and the signal processing unit 50 of the optical receiver boa is accessible to the skilled person. FIG. 11 shows a more detailed schematic view of an exemplary optical receiver like the optical receiver boa of FIGS. 5 and 10. As shown in FIG. 11, in some embodiments, the optical front end 30 comprises a polarization beam splitter 32 that receives and splits the carrier signal 80 and a splitter 34 that receives and splits an optical signal generated by a local oscillator 46 of the optical receiver boa. The optical front end 30 further comprises a first 90° hybrid 36a connected to one of the output branches of the polarization beam splitter 32 and to one of the output branches of the splitter 34 and a second 90° hybrid 36b connected to the other one of the output branches of the polarization beam splitter 32 and to the other one of the output branches of the splitter 34. Each of the outputs of the first and second 90° hybrids 36a and 36b is respectively connected to a photodiode 38a-d and each of the photodiodes 38a-d is connected to a transimpedance amplifier 44a-d. Further, as shown in FIG. 11, in some embodiments, the signal processing unit 50 may comprise a plurality of analog digital converters, ADC, 52a-d, wherein each of the analog/digital converters 52a-d is connected between a corresponding one of the transimpedance amplifiers 44a-d and a common digital signal processor 54 that is configured for outputting the output signal 84. However, other internal configurations of the optical receiver boa are possible according to the present invention.

FIG. 6 shows an optical system according to another embodiment of the invention. The optical system of FIG. 6 comprises an optical receiver 10 that corresponds or is at least functionally similar to the optical receiver ma of the embodiment shown in FIG. 5. The description of identical elements, which are indicated with identical reference signs in FIG. 5, is omitted for brevity. In the optical system illustrated in FIG. 6, a copropagating optical signal emitter that is an OTDR device 16a-c, wherein each OTDR device 16a-c is arranged in one of the spans 40a-c and emits a periodic copropagating optical signal in the form of an OTDR signal comprising OTDR pulses into a corresponding transmission fiber 12a-c. Each of the OTDR devices 16a-c is connected to a control system 18. The control system 18 controls the operation of the OTDR devices 16a-c. The control system 18 can be configured to control the OTDR devices 16a-c such that the optical carrier signal 80 is only distorted by a single copropagating OTDR signal at a time. The control system 18 may further allow limiting the occurrence of distortions in the optical carrier signal 80 to certain selected periods of time. The control system 18 can be configured to communicate the aforesaid selected periods of time can to the optical receiver 10a, which allows for a more efficient compensation of the distortions.

Alternatively, the OTDR devices 16a-c can be configured to emit OTDR pulses simultaneously, preferably OTDR pulses having the same period. Given that all OTDR pulses have the same period, the corresponding distortions induced by each of the OTDR devices upon the optical carrier signal 80 will all have the same period, such that the method according to any of the embodiments of the invention described herein can be used for compensating the distortions in the optical carrier signal at the receiving end, in this case at the optical receiver 10.

However, the OTDR devices 16a-c can also be configured to emit OTDR pulses simultaneously having different periods. In that case, the resulting distortions induced upon the optical carrier signal 80 will have a periodic structure corresponding to a combination period larger than the largest of the periods of the OTDR pulses emitted by the OTDR devices 16a-c, such that the method according to any of the embodiments of the invention described herein can be used for compensating the distortions in the optical carrier signal 80 at the receiving end, in this case at the optical receiver ma, by correspondingly adapting the method such that each measurement for averaging corresponds to the combination period.

Figure 7:
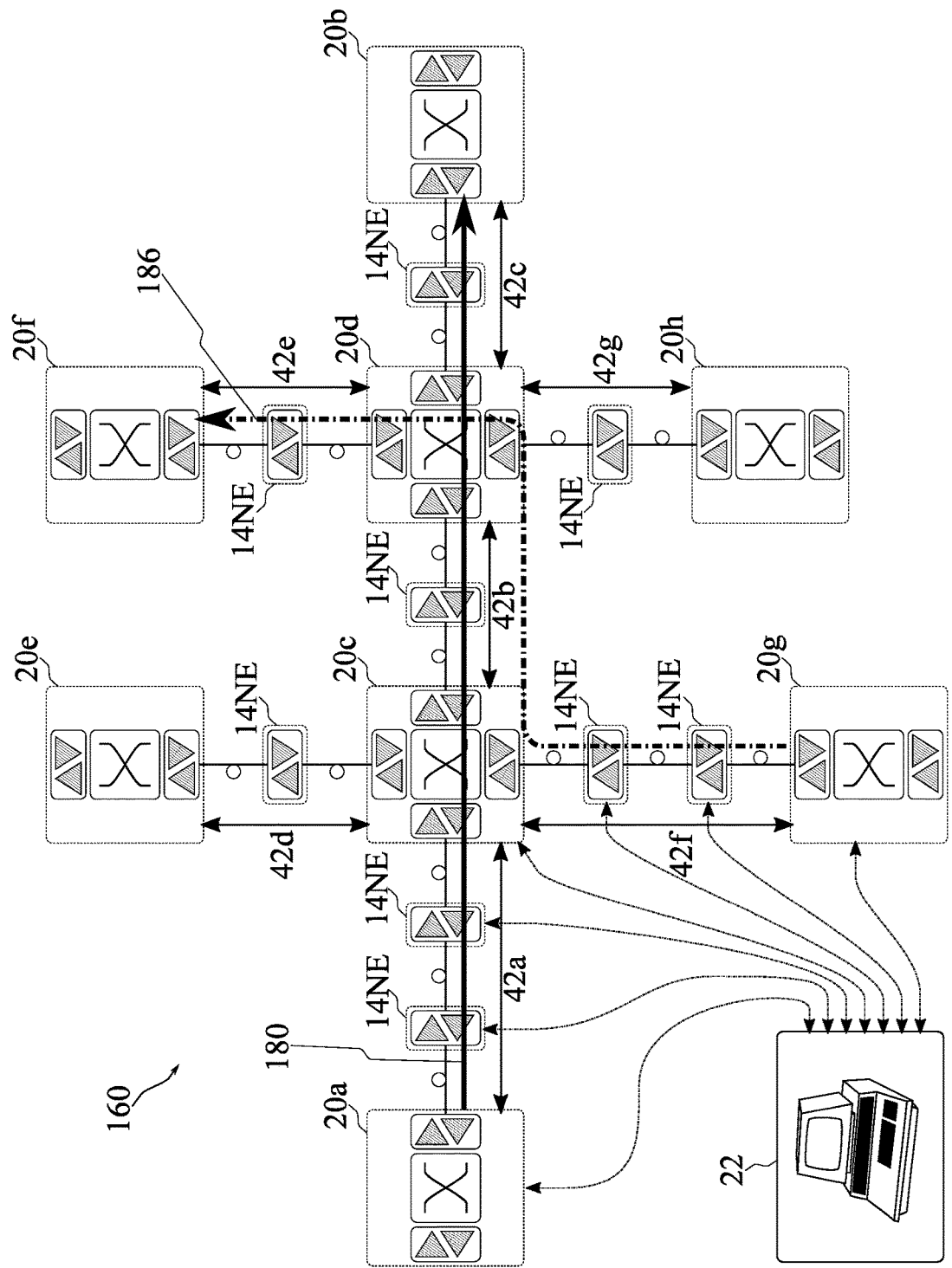
FIG. 7 shows an optical network according to a further embodiment of the invention.

FIG. 7 illustrates an optical multiplex system 160 for transmitting multiplex optical signals over a plurality of optical channels according to an embodiment of the invention. The optical multiplex system 160 shown in FIG. 7 is an optical multiplex network. In the optical network of FIG. 7, a number of photonic crossconnects 20a-h are pairwise connected by means of optical fibers extending in corresponding optical multiplex sections 42a-g thereby allowing bidirectional communication. A plurality of optical amplifiers 14NE are distributed in the different optical multiplex sections 42a-g between mutually connected photonic crossconnects 20a-h. As illustrated in the figure with a continuous dark line, a first multiplex optical signal 180 is emitted at the photonic crossconnect 20a and sent through the optical multiplex section 42a, the photonic crossconnect 20c, the optical multiplex section 42b, the photonic crossconnect god, and the optical multiplex section 42c, to the photonic crossconnect 20b, at which the first multiplex optical signal 180 is received. An optical receiver 10 according to the present invention can be connected to or comprised in the photonic crossconnect 20b and configured for receiving the multiplex optical signal 180.

Further, as illustrated in FIG. 7 with a discontinuous dark line, a periodic second multiplex optical signal 186 is emitted at the photonic crossconnect tog and sent through the optical multiplex section 42f, the photonic crossconnect 20C, the optical multiplex section 42b, the photonic crossconnect god, and the optical multiplex section 42e, to the photonic crossconnect 20f, at which the second multiplex optical signal 186 is received. In some examples, the first and second multiplex optical signals 180 and 186 may be transmitted on different channels or on the same channel, e.g. on a so-called super channel.

As illustrated in FIG. 7, the first and second multiplex optical signals 180 and 186 copropagate in the optical multiplex section 42b. As a consequence of this, the second multiplex optical signal 186 induces a distortion upon the first multiplex optical signal 180, such that when the first multiplex optical signal 180 is received by an optical receiver comprised in or connected to the photonic crossconnect 20b, the first multiplex optical signal 180 is distorted by the second multiplex optical signal 186, which is however not received at the aforesaid optical receiver. Therefore, said optical receiver can advantageously be an optical receiver according to embodiments of the present invention and be configured to make use of the methods disclosed herein in order to compensate the signal distortions induced in an optical carrier signal, in this case the first multiplex optical signal 180, by a copropagating optical signal, in this case the second multiplex optical signal 186.

The photonic crossconnects 20a-h and the amplifiers 14NE of the optical network of FIG. 7 are connected to a management system 22, although only some of the connections are represented in the figure by dashed lines. The management system 22 has all the information about the transmitted channels, and can hence be configured to provide information about the period of the corresponding copropagating optical signals (e.g., the second multiplex signal 186) to a corresponding optical receiver that may be connected to the optical network 160 via one or more of the photonic crossconnects 20a-h. Furthermore, the management system 22 of the optical network 160 can be configured to implement the time control functionality previously described with respect to FIG. 6.

Figure 8:
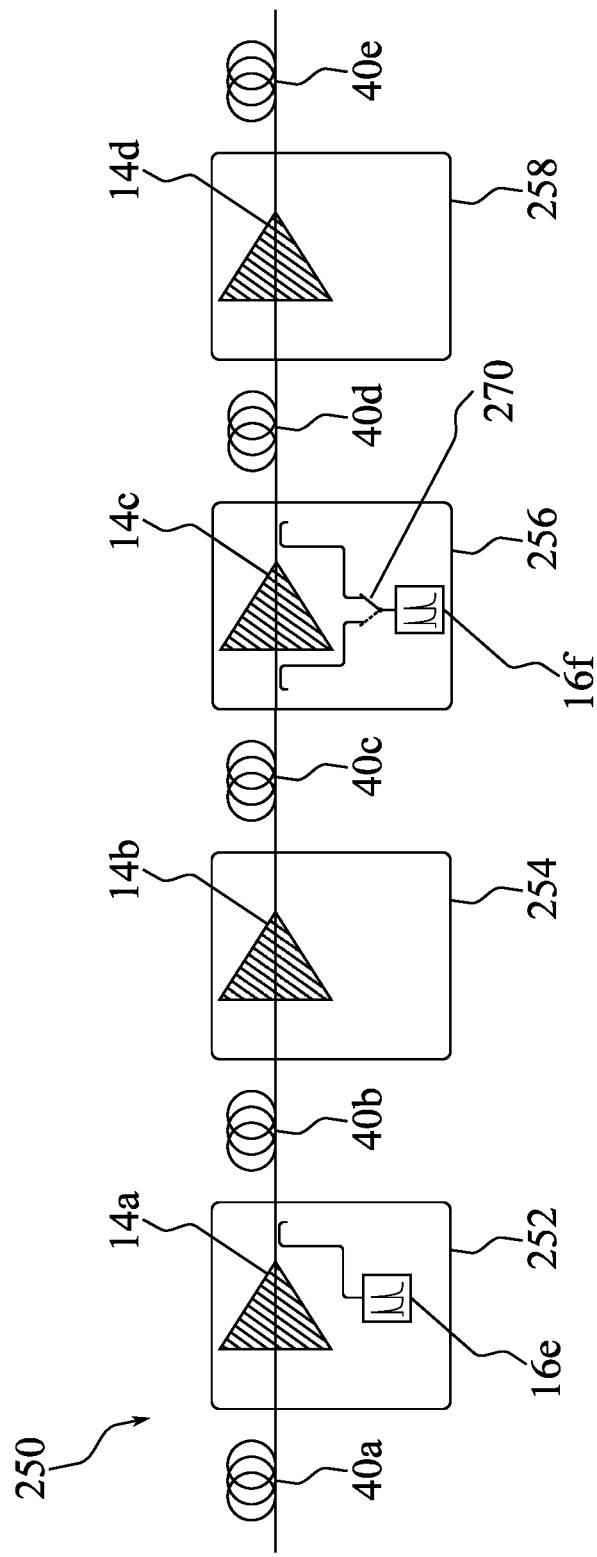
FIG. 8 shows a part of an optical system according to a further embodiment of the invention.

FIG. 8 shows an optical system 250 according to an embodiment of the invention. The optical system 250 can correspond to a part of an optical network, wherein the optical network comprises a first network element 252, a second network element 254, a third network element 256, and a fourth network element 258, which are mutually connected by means of corresponding optical spans 40b, 40c, and 40d. Further, the first network element 252 is optically connected to a leftmost optical span 40a for optically connecting the optical system 250 with other downstream parts of the optical network, and the fourth network element 258 is optically connected to a rightmost optical path 40e for optically connecting the optical system 250 with other upstream parts of the optical network.

The first to fourth network elements 252, 254, 256, and 258 comprise respective optical amplifiers 14a-14d for amplifying a carrier signal entering the optical system 250 through the leftmost optical span 40a directed to the rightmost optical span 40e. The first network element 252 comprises an OTDR device 16e for emitting OTDR pulses into the span 40b for monitoring the characteristics of the fiber span 40b. The third network element 256 comprises an OTDR device 16f coupled to an optical switch 270. The optical switch 270 allows selectively emitting the OTDR pulses emitted by the OTDR device 16f in a backward direction into the fiber span 40c or in a forward direction into span 40d. The second network element 254 and the fourth network element 258 need not comprise an OTDR device. Thanks to the ability of the network element 256 to selectively emit OTDR pulses into span 40c or into span 40d, no additional OTDR device is required in network element 254 for implementing complete supervision of the spans 40b to 40d. In this way, a significant reduction of equipment requirements and costs can be achieved OTDR pulses copropagating with an optical carrier signal codirectionally may cause significantly stronger signal distortions on the optical carrier signal as compared to OTDR pulses copropagating with the optical carrier signal counterdirectionally. Therefore the optical power used for codirectional OTDR monitoring and hence the monitoring quality, in particular the monitoring range, was strongly limited according to previously known solutions. According to the method and the optical system of the present invention, a greater optical power can be used for the OTDR pulses emitted by the OTDR devices the and 16f, since the resulting distortions in the optical carrier signal can be compensated according to the invention as explained above. For example, with reference to the optical system 250 shown in FIG. 8, this allows not including additional OTDR devices in the second network element 254 for monitoring the optical spans 40c and 40d arranged between the second network element 254 and the fourth network element 258, since these spans 40c and 40d can both be monitored by means of OTDR pulses emitted at the third network element 256 by using a sufficiently high optical power for the OTDR pulses emitted by the OTDR device 16f.

The OTDR devices 16, 16a-f of the exemplary embodiments disclosed in FIGS. 5, 6, and 8 need not be continuously operated and they can instead be periodically turned on and off for some limited time in order to perform OTDR monitoring. Correspondingly, the method of the present invention needs not be continuously implemented and the signal processing unit of the optical receiver ma needs not be activated when no copropagating optical signal is to periodically distorting the optical carrier signal that is being received at the optical receiver ma, for example when the OTDR devices 16, 16a-f of FIGS. 5, 6, and 8 are not active.

Further, for implementing the method of the present invention, it is a sufficient condition that all OTDR devices that may act as copropagating optical signal emitters in an optical system according to the invention (cf. OTDR devices 16a-f in FIGS. 6 and 8) operate at the same period. No further synchronization or coordinated control of the OTDR devices is required.

FIG. 12 schematically illustrates a method according to embodiments of the present invention as implemented in an optical receiver according to embodiments of the present invention. Thus, FIG. 12 represents both an optical receiver according to embodiments of the present invention and a method, which such an optical receiver is configured for carrying out.

FIG. 12a shows the operations carried out for compensating signal distortions induced in an optical carrier signal 80 by a periodic copropagating optical signal, for example by an OTDR signal as one of the OTDR signals emitted by one of the OTDR devices described with respect to FIGS. 5 and 6 or by a multiplex optical signal as the second multiplex optical signal 186 described with respect to FIG. 7, according to an embodiment of the present invention.

As described above, the method according to embodiments of the present invention comprises receiving, at an optical receiver, an optical carrier signal 80, which is distorted by a copropagating optical signal 86. Thereupon, a period of a periodic component of an optical carrier signal is detected and a periodic distortion of the optical carrier signal 80 caused by the copropagating optical signal 86 is determined based on said period. The operations of determining the period of the periodic component of the optical carrier signal 80 and of determining the periodic distortion of the carrier signal caused by said copropagating optical signal 86 based on said period may be combinedly implemented by a periodic signal detector 62. Notably, since a periodic component of the optical carrier signal 80 is determined from the optical carrier signal 80 or from the electrical detection signal 82 electrically representing the optical carrier signal 80, the copropagating optical signal 86 needs not be received at the optical receiver ma, as previously explained. Further, a compensation signal is generated to correct the carrier signal according to determine periodic phase variation, for example by a distortion compensator 60. The distortion compensator 60 and the periodic signal detector 62 described with respect to FIG. 11a may in particular be modules or components of a signal processing unit 50 of an optical receiver ma, as described with respect to FIGS. 5, 6, 10, and 11.

Like FIG. 12a, FIG. 12b schematically illustrates the operations carried out by an optical receiver according to other embodiments of the present invention for compensating signal distortions induced in an optical carrier signal 80 by a periodic copropagating optical signal. The optical receiver illustrated in FIG. 12b is configured for receiving an optical carrier signal 80, which is distorted by a periodic optical copropagating optical signal and for transforming information encoded in the optical carrier signal 80 into an electrical detection signal 82. The optical receiver illustrated in FIG. 12b comprises a distortion compensator 60 and a periodic signal detector 63 that are respectively analogous to the distortion compensator 60 and the periodic signal detector 62 described with respect to FIG. 12a.

In addition, the optical receiver represented in FIG. 12b, comprises an electrical or logical switch 70, a compensation signal generator 64, a storage device 68, a distortion detector 72, a signaling input port 74, and a controller 76. All the aforesaid components may correspond to modules or components of a signal processing unit of an optical receiver according to embodiments of the present invention, like the signal processing unit 50 of the optical receivers 10a described with respect to FIGS. 5 and 10.

The periodic signal detector 63 is configured for determining a period of a periodic component of the optical carrier signal 80 and to determine a periodic distortion of the optical carrier signal 80 based on the determined period. As explained above with respect to FIG. 9, the periodic distortion can be determined in the form of a waveform, which can be transmitted to the compensation signal generator 64 via the electrical or logical switch 70 if the switch is in its upper position, as shown in the drawing. Notably, said periodic distortion can correspond to a periodic phase variation. In the case of a complex phase, the periodic phase variation can correspond to an amplitude variation of the optical carrier signal or to a combination of phase and amplitude variations of the optical carrier signal. The compensation signal generator 64 is configured for generating a compensation signal to correct the optical carrier signal 80 according to the periodic phase variation determined by the periodic signal detector 63. Using said compensation signal, the distortion compensator 60, which is connected to the compensation signal generator 64 and receives the compensation signal, compensates the signal distortions induced in the carrier signal 80 and outputs a compensator output signal 84.

The compensation signal generated by the compensation signal generator 64 is also transmitted to the storage device 68 and stored therein. In the embodiment shown, the storage device 62 is comprised in the optical receiver. However, in other embodiments, a storage device like the storage device 68 may be an external storage device connectable to the optical receiver and/or to the signal processing unit thereof. In some embodiments, only the waveform corresponding to one period can be stored in the storage device 68, such that a complete compensation signal needs not be stored in the storage device 68.

Storing the compensation signal or at least the waveform of a period thereof in the storage device 68 allows using the stored compensation signal or waveform for compensating subsequent carrier signals that are distorted by the same or a similar copropagating optical signals. For this purpose, the signal processing unit of the optical receiver shown in FIG. 12b can comprise a distortion detector 72 configured for identifying a situation in which a received carrier signal 80 resembles a previously received carrier signal 80 to the extent of assuming that said carrier signal and said previously received carrier signal are distorted by identical or similar copropagating optical signals. In that case, the distortion detector 72 may communicate to the controller 76 that a received carrier signal reassembles a previously received carrier signal, such that a previously stored compensation signal, stored in the storage device 68, can be reused. The controller 76 may then instruct the storage device 68 to provide the stored compensation signal or waveform by setting the electrical or logical switch 70 to the lower position, to the compensation signal generator 64, such that the carrier signal 80 can be compensated by the distortion compensator 60 using the same compensation signal that was used before for the previously received carrier signal 80.

In the embodiments shown, an input signal indicating the period of the copropagating optical signal is transmitted with the optical carrier signal 80, 180, for example in a dedicated frequency range of the optical carrier signal 80, 180 or in overhead bits. The input signal can be distorted by a different copropagating optical signal, such as a signal transmitted over an OSC channel or a data signal. However, the input signal may also be transmitted with the copropagating optical signal 80, 160, for example with an OSC channel, or by any other means, such as wireless communication. For example, the optical carrier signal 80, 180 can have one or more frequencies or channels between 191.6 THz (1565 nm) and 195.9 THz (1530 nm), with the input signal being transmitted with the optical carrier signal at a frequency of 193.4 THz, while the copropagating optical signal 86, 186 can have an exemplary frequency of 197.2 THz. However, the input signal may also be transmitted by any other connectivity means, for example over a dedicated optical connection other than the first optical path 40.

Figure 13:
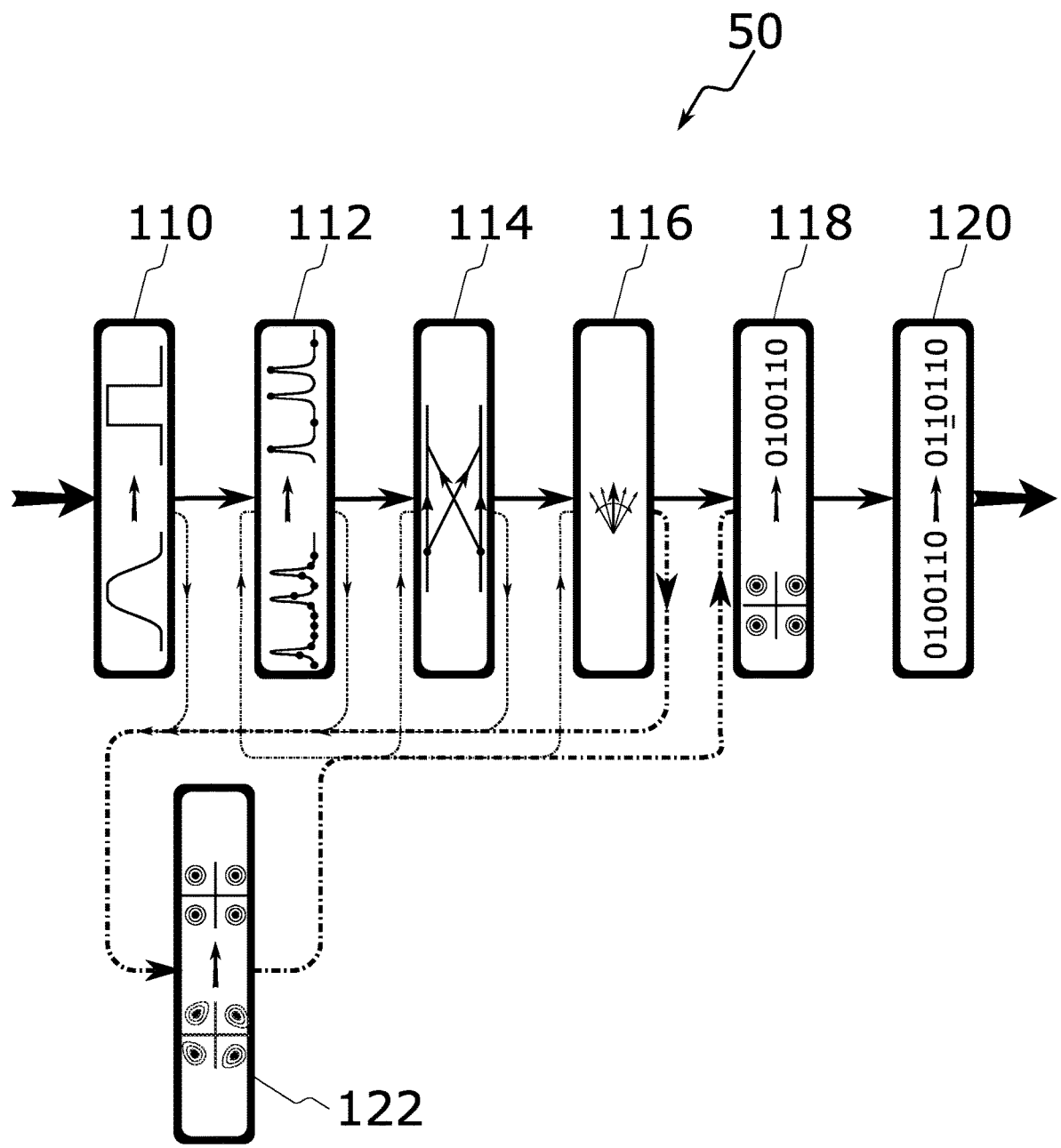
FIG. 13 is an illustration of signal processing steps in an optical receiver according to an embodiment of the invention.

An exemplary functional architecture of the signal processing unit of an optical receiver according to embodiments of the invention is illustrated in FIG. 13. The upper row illustrates the compensation of linear distortions (e.g. group-velocity dispersion) 110, clock recovery 112, MIMO processing 114 and phase estimation 116 of an optical carrier signal, comprising phase recovery and frequency offset compensation. Finally, data transmitted through the optical carrier signal is recovered in a decoding step 118 and bit errors are corrected by means of forward error correction (FEC) 120. The functionalities 110 to 120 are exemplarily illustrated in a possible order, although different orders are also possible.

The periodic distortions of the optical carrier signal caused by a periodic copropagating optical signal are compensated 122 according to the invention preferably after performing signal equalization and resampling, i.e. after compensation of linear distortions 110, clock recovery 112, MIMO processing 114, and carrier phase estimation 116. However, the compensation of periodic distortions according to the method of the present invention can also be performed before all these steps (110 to 116) have been completed. For example, the periodic distortions of the optical carrier signal may also be removed before MIMO processing 114. i.e. between the steps 112 and 114 as shown in FIG. 13. The compensation of periodic distortions according to the method of the present invention 122 can also be performed directly after compensating linear effects no and before resampling 112.

The copropagating optical signal emitters of embodiments of the present invention (cf. OTDR devices 16 and 16a-f in FIGS. 5, 6, and 8, 16 can be configured for emitting a trigger pulse before emitting a sequence of OTDR pulses, and the optical receiver 10, 10' can be configured for inferring from the trigger pulse that the optical carrier signal to be received at the optical receiver 10, 10' is, from the reception of the trigger pulse on, distorted by the sequence of pulses of the copropagating optical signal the sequence of OTDR pulses is going to be received. The trigger pulse may be a single pulse having an amplitude smaller or larger than the following OTDR pulses, for example at least two times smaller or larger. Upon receiving the trigger pulse, the optical receiver 10 knows that a distorted optical carrier signal is going to be received soon. For example, the signal processing unit 50 can be turned on or switched back to an operative state from a standby state or an off the state upon receiving the trigger pulse such that the signal processing unit 50 be ready for receiving and processing the subsequent optical carrier signal distorted by the corresponding sequence of OTDR pulses. In other embodiments, the trigger signal may be derived from the signal distortions.

In some embodiments, the optical receiver ma can be configured for detecting the trigger pulse in the copropagating optical signal, when the copropagating optical signal is received at the optical receiver ma. Additionally or alternatively, the copropagating optical signal emitter (e.g. an OTDR device 16, 16a-f in FIGS. 5, 6 and 8) can be configured to transmit the trigger pulse to the optical receiver ma via a dedicated channel, for example via the control system 18 (cf. FIG. 6) or via the management system 22 (cf. FIG. 7), respectively.

The upper row of FIG. 14A shows a first sequence of OTDR pulses and a second sequence of OTDR pulses following the first sequence of OTDR pulses in time emitted by a copropagating optical signal emitter or OTDR device in an optical system according to embodiments of the present invention, for example the OTDR device 16 of FIG. 5. Each of the first and second sequence of OTDR pulses comprises a plurality of OTDR pulses. The beginning of each of the first and second sequences of OTDR pulses is signaled by a corresponding trigger signal. The lower row of FIG. 14A shows the compensation signal that is generated by the signal processing unit of the corresponding optical receiver, for example by the signal processing unit 50 of the optical receiver 10 illustrated in of FIGS. 5 and 10 for each of the first and second sequence of OTDR pulses.

Figure 14:
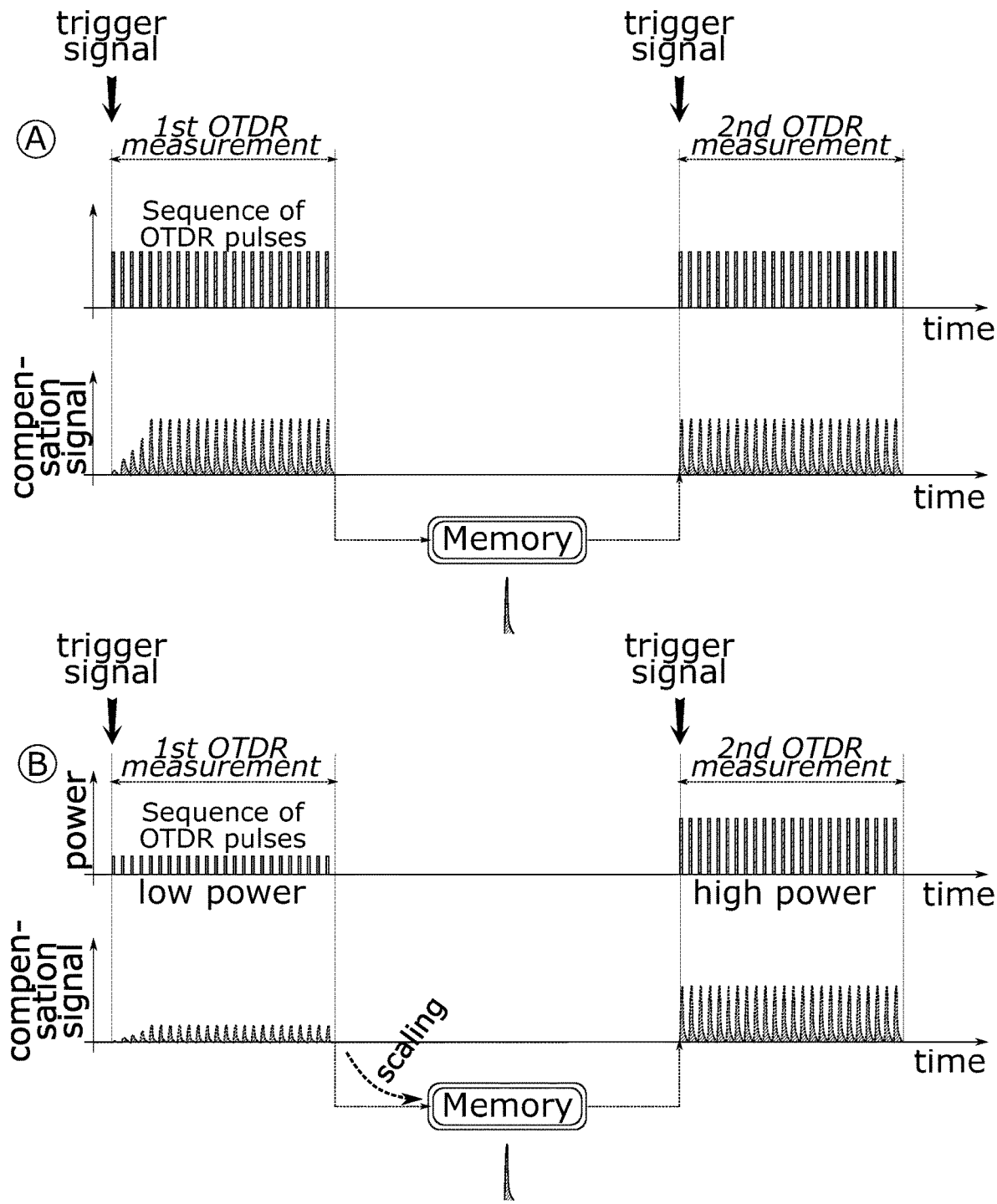
FIG. 14 illustrates two modes of operation according to an embodiment of the invention.

In the embodiment shown in FIG. 14, the first and second sequences of OTDR pulses each comprise 24 OTDR pulses. The signal processing unit 50 is configured to generate the compensation signal by averaging over 10 periods of the periodic component of the optical carrier signal.

While insufficient averaging may manifest in the compensation signal in the form of bit errors at the beginning of the first sequence of OTDR pulses, this does not happen in the case of the compensation signal generated for the second sequence of OTDR pulses. The reason for this is that, for the second sequence of OTDR pulses, the signal processing unit 50 needs not generate a respective compensation signal by carrying out again the method steps illustrated in FIG. 4. Instead, the signal processing unit 50 is configured for storing the compensation signal determined for the first sequence of OTDR pulses at the end of the first sequence of OTDR pulses into the storage device 14. The compensation signal stored in the storage device 14 is then used by the signal processing unit 50 for compensating the second sequence of OTDR pulses, so that there are no significant bit errors due to bad averaging at the beginning of the case of the second sequence of OTDR pulses.

FIG. 14B illustrates a further embodiment in which the copropagating optical signal emitter 16 of FIG. 5 is configured for emitting a first sequence of OTDR pulses of the copropagating optical signal with a first optical power (cf. left-hand side of the upper row) before emitting a second sequence of OTDR pulses with a second power (cf. right-hand side of the upper row), wherein the first optical power is smaller than the second optical power. The first sequence of OTDR pulses is not intended for real monitoring purposes, like OTDR measurements. The first sequence of OTDR pulses is instead intended to be used to determine the signal distortions induced in the optical carrier signal by the periodic copropagating optical signal and a corresponding first compensation signal. Due to the reduced power level, the first sequence of OTDR pulses does not suffer from bit errors significantly. The compensation signal for the second sequence of OTDR pulses is generated by the signal processing unit 50 of FIG. 10 by scaling the first compensation signal, wherein the scaling factor corresponds to the ratio of the second optical power to the first optical power or a function thereof. In the embodiment shown, the first optical power is 4 times the first optical power, so that the scaling factor applied by the signal processing unit 50 to the first compensation signal to obtain the compensation signal for compensating distortions in the pulses of the second sequence of OTDR pulses is a factor of 4.

Figure 15:
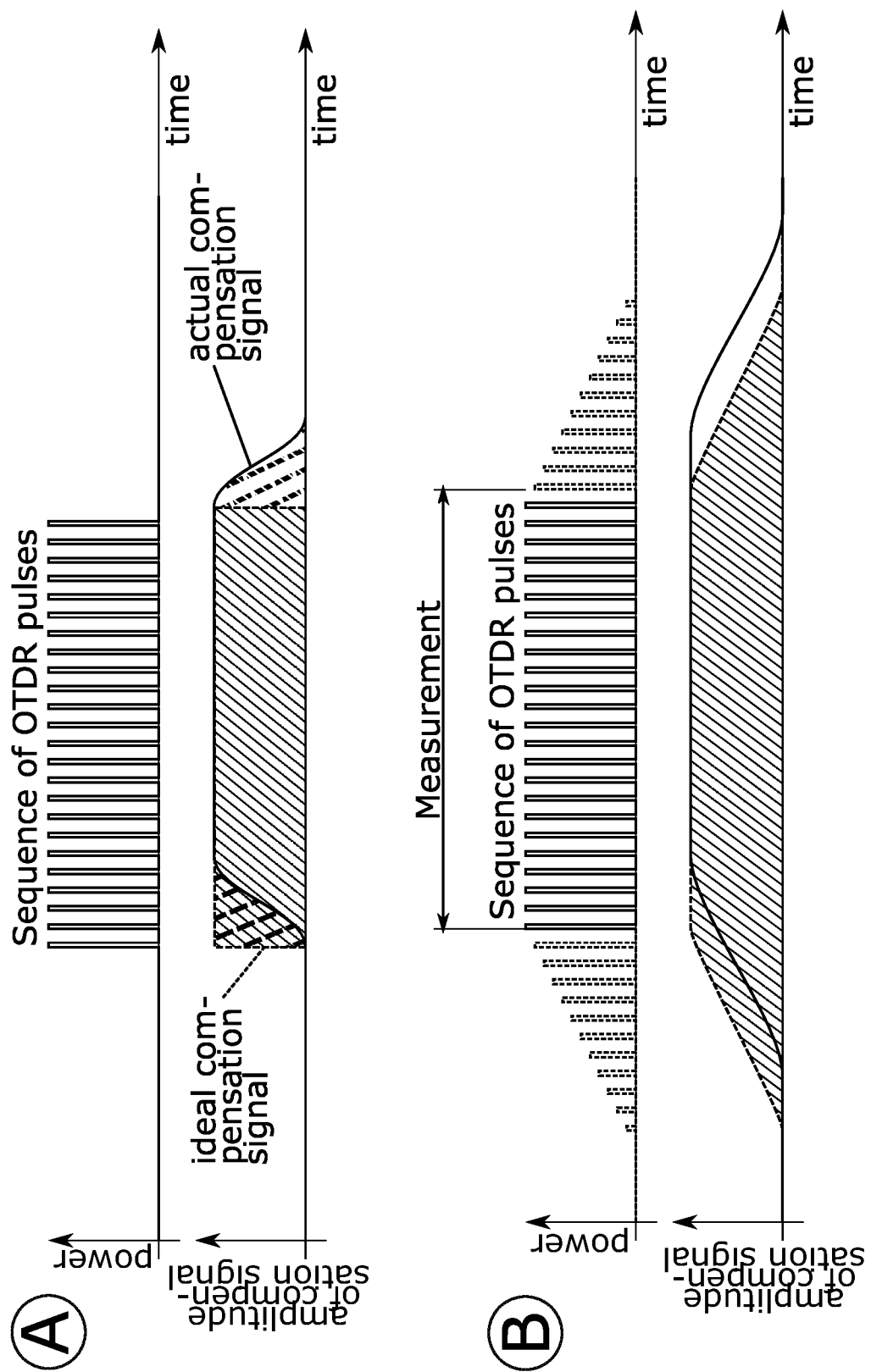
FIG. 15 illustrates a further mode of operation according to an embodiment of the invention.

FIG. 15A shows in the upper row a sequence of OTDR pulses comprised in the copropagating optical signal emitted by the copropagating optical signal emitter 16 of FIG. 5 according to an embodiment of the invention. In the lower row, FIG. 15A illustrates the difference between an ideal compensation signal that would lead to an ideal compensation of the distortions induced by the copropagating optical signal on the carrier signal and the actual compensation signal generated by the signal processing unit 50.

In the embodiment shown, the copropagating optical signal emitter 16 is configured to emit sequences of 24 OTDR pulses having a total duration, i.e. a measurement sequence time, corresponding to 24 times the predefined period. The signal processing unit 50 is configured to generate the compensation signal by averaging over 5 periodic phase variations of the carrier signal caused by the periodic copropagating optical signal 86 determined by the signal processing unit 50. However, during the first pulses of a sequence, the signal processing unit 50 may have received fewer OTDR pulses than 5 and may hence have to produce averages based on fewer than 5 periodic phase variations. Due to this, bad averaging at the beginning and at the end of each sequence of pulses of the copropagating optical signal results in a large deviation of the actual compensation signal generated by the signal processing unit 50 and the ideal compensation signal that would ensure correct compensation of the distortions, as is seen in FIG. 15A.

FIG. 15B illustrates the situation for embodiments of the invention in which the copropagating optical signal emitter 16 is configured both for progressively increasing the optical power of the sequence of pulses at the beginning thereof for a ramp up time and for progressively decreasing the optical power of the sequence of pulses at the end thereof for a ramp down time. In the embodiment shown, the ramp up time, i.e. the time during which the optical power of the pulses of the copropagating optical signal emitted by the copropagating optical signal emitter 16 is increased from zero to a maximum value, is about ½ of an averaging time corresponding to the product of the number of pulses used for averaging (10 in this exemplary case) and the time distance between two successive pulses. The ramp down time, i.e. the time during which the optical power of the pulses of the copropagating optical signal emitted by the copropagating optical signal emitter 16 is decreased from the maximum value to zero is likewise about ½ of the an averaging time. Thus the sequence shown in FIG. 15B has an overall duration that is approximately twice the duration of the sequence shown in FIG. 15A.

Since the optical power of the pulses of the copropagating optical signal, i.e. the amplitude of the pulses, increases or decreases progressively at the beginning and at the end of the sequence of OTDR pulses of FIG. 15B, the result of the averaging carried out by the signal processing unit 50 also increases or decreases accordingly, whereby large discrepancies between the ideal compensation signal and the actual compensation signal generated by the signal processing unit 50 can be avoided.

Figure 16:
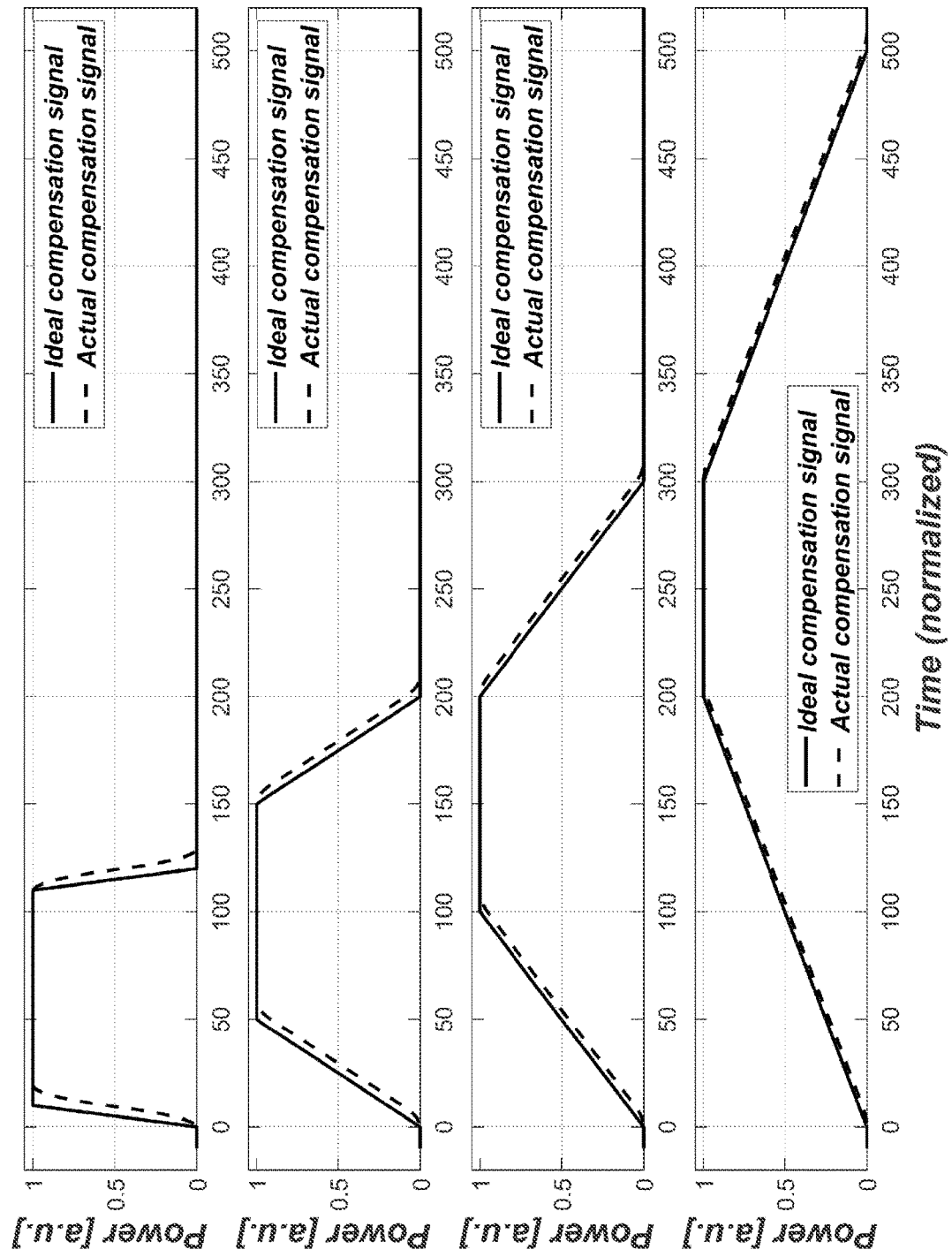
FIG. 16 shows actual and ideal compensation signals for various durations of the "ramp up" and "ramp down" phases in methods according to embodiments of the invention.

In other similar embodiments, the ramp up time and the ramp down time may be larger than in the embodiment illustrated in FIG. 15B. FIG. 16 illustrates the relationship between the ideal compensation signal and the actual compensation signal generated by the signal processing unit 50 for different durations of the ramp up time and the ramp down time and for the same maximum power time, i.e. for the same time for which the optical power of the copropagating optical signal corresponds to a maximum value. In the embodiment shown, the maximum power time corresponds to 100 normalised units of time. The ratio of the ramp up time and the ramp down time to the maximum power time of the copropagating optical signal increases from the first row, in which the ramp up time and ramp down time are short with respect to the maximum power time, to the fourth row, in which the ramp up time and the ramp down time are long with respect to the maximum power time.

Figure 17:
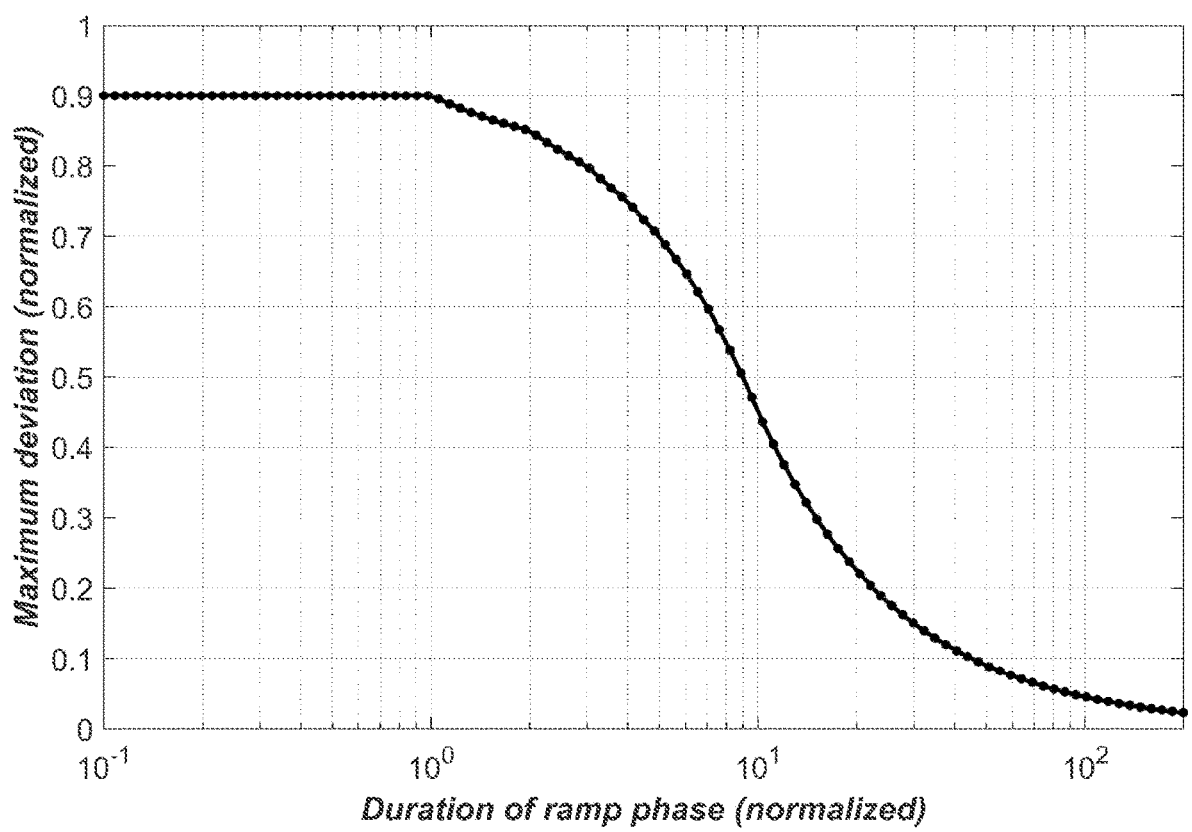
FIG. 17 represents the maximum deviation between actual and ideal compensation signal versus duration of the ramp phases in methods according to embodiments of the invention.
Figure 19:
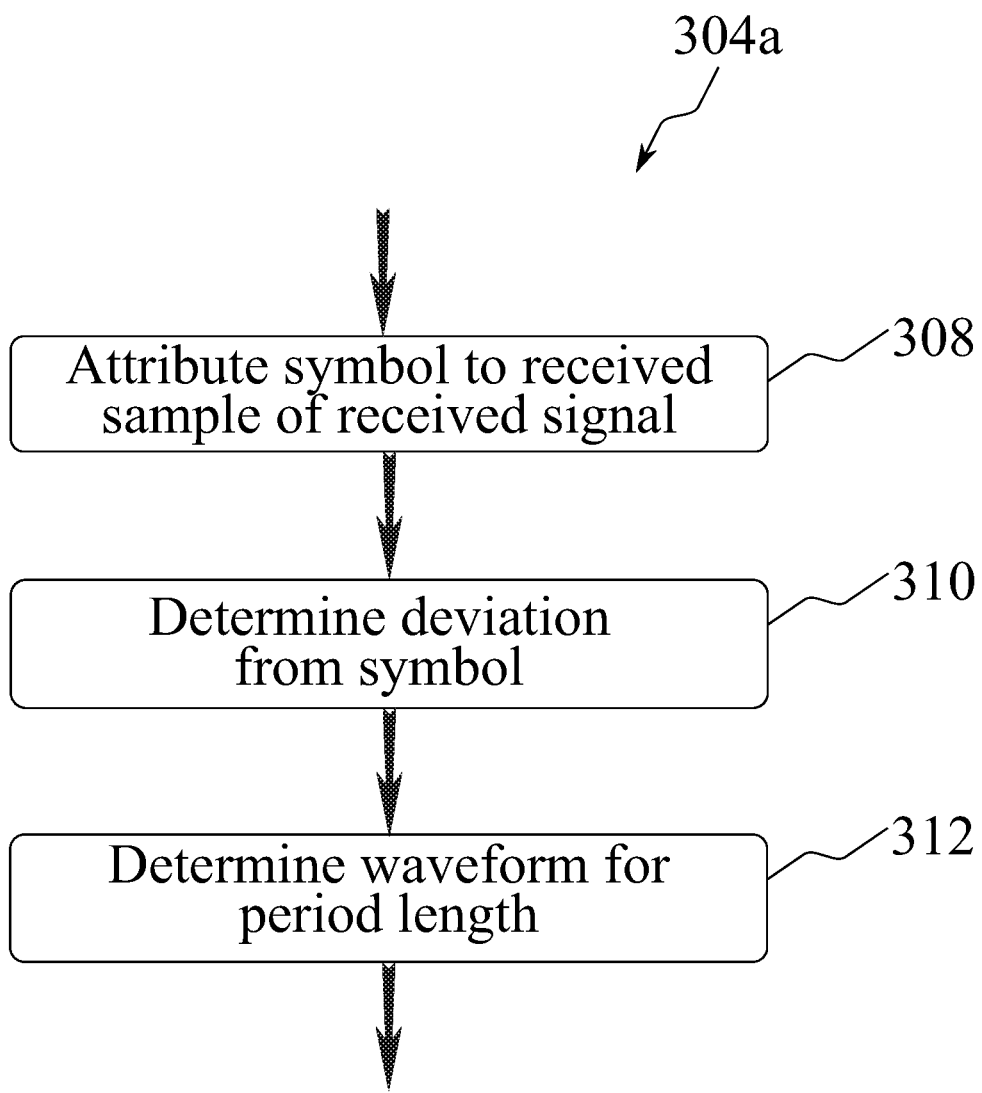
FIG. 19 is a flow diagram illustrating a method according to an embodiment of the invention.
Figure 20:
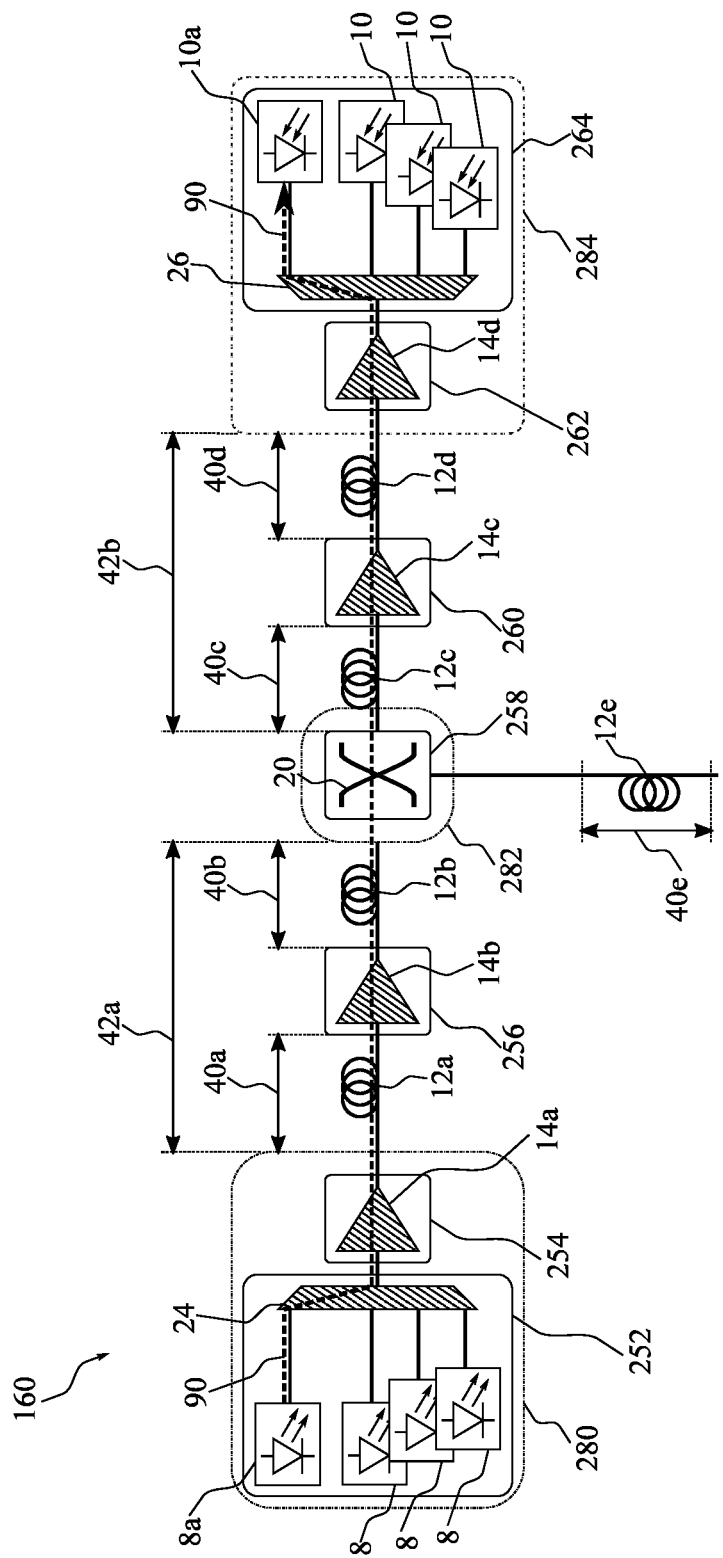
FIG. 20 shows an exemplary optical system.

As can be seen in FIG. 16, a larger ratio of the ramp up time and the ramp down time to the maximum power time results in a smaller deviation of the actual compensation signal generated by the signal processing unit 50 from the ideal compensation signal. This is also illustrated in FIG. 17, in which the dependence of the maximum deviation of the actual compensation signal generated by the signal processing unit 50 from the ideal compensation signal is shown as a function of the duration of each of the ramp up time and the ramp down time in normalised units of time, wherein the ramp up time and the ramp down time have the same duration.

In some embodiments, if the signal processing unit 50 has received information about the duration of a sequence of pulses of the copropagating optical signal, the signal processing unit 50 can be configured to wait a predefined time between the detection of the beginning of the sequence of pulses of the copropagating optical signal and the beginning of the measurement of periodic phase variations that are involved in the determination of the periodic phase variation of the carrier signal, and to end the measurement of the aforesaid periodic phase variations a predefined time before the end of the sequence of pulses of the copropagating optical signal.

Notably, if the pulses of the copropagating optical signal are generated progressively increasing and/or decreasing the optical power of a sequence of pulses as previously described with respect to FIG. 15B, the trigger signal described with respect to FIG. 14 needs not be implemented, although both configurations may also be used in combination.

As shown above, compensating of periodic distortions in an optical carrier signal according to embodiments of the present invention can comprise determining the periodic distortion of the optical carrier signal caused by the copropagating optical signal using a Viterbi-Viterbi phase recovery technique. However, the present invention is not limited to the use of a Viterbi-Viterbi phase recovery technique and is suitable for compensating any kind of periodic distortions, irrespectively of whether they affect the amplitude (intensity) and/or the phase of the optical carrier signal.

In the following, a general example in which the periodic copropagating optical signal causes distortions in both the amplitude and the phase of the optical carrier signal is considered.

FIG. 18a illustrates a constellation diagram of an optical carrier signal that is a 8QAM signal comprising eight symbols with two amplitude values for the symbols. There are two sets of four symbols having identical amplitude, such that inner and outer symbols of the optical carrier signal can be distinguished. The distortions caused by a copropagating optical signal manifest as deviations from each of the symbols copropagating optical signal that are represented in FIG. 18d as trajectories, which may have interruptions. Distortions induced by the copropagating optical signal can be described by a single trajectory as shown in FIG. 18d that represents the distortions in the optical carrier signal during one period of the copropagating optical signal in the constellation diagram. The trajectories corresponding to the distortions caused by the copropagating optical signal can also be described by corresponding time variations in the phase and the amplitude of the optical carrier signal, which are respectively illustrated in FIGS. 18b and 18c.

Such simultaneous time variations in the phase and amplitude of the optical carrier signal may for example be induced by the joint effects of cross-phase modulation (XPM) and stimulated Raman scattering (SRS) caused by the interaction between the optical carrier signal and the copropagating optical signal. Whereas XPM results in an additive term to the phase of a symbol of the optical carrier signal, SRS results in a multiplicative effect. In other words, SRS leads to a multiplication of the amplitude of a symbol of the optical carrier signal by a factor determined by the copropagating optical signal.

In some embodiments of the invention, determining periodic distortions in the optical carrier (cf. step 304 in FIG. 4) can comprise subtracting a phase value of the received optical carrier signal from an estimated phase value of a corresponding symbol. Additionally or alternatively, determining periodic distortions in the optical carrier (cf. step 304 in FIG. 4) can comprise multiplying an estimated amplitude value of the aforesaid symbol by an amplitude value of the received optical carrier signal, which may be implemented in some examples by means of an amplifier.

Step 304 of the method described with respect to FIG. 4 may then comprise a step 308 of receiving at the optical receiver boa an optical carrier signal and attributing data samples contained therein to a symbol out of a symbol alphabet, a step 310 of determining symbol deviations as described above by determining a phase value and an amplitude value for the received optical carrier signal, and a step 312 of determining the trajectory of the signal distortions is for one period of the periodic copropagating optical signal.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications that presently or in the future may lie within the scope of protection of the invention as defined in the claims are likewise protected.

LIST OF REFERENCE SIGNS 8, 8a Optical transmitter
10, ma Optical receiver
12, 12a-d Transmission fiber
14a-d, 14NE Optical amplifier
16, 16a-f OTDR device
18 Control system
20, 20a-h Photonic cross connect
22 Management system
24 Multiplexer
26 Demultiplexer
30 Optical front end
32 Polarization beam splitter
34 Splitter
36a, 36b 90° hybrid
38a-d Balanced receiver (photodiode)
40a-e Optical fiber span
42a-g Optical multiplex section
44a-d Transimpedance amplifier (TIA)
46 Local oscillator
50 Signal processing unit
52a-d Analog digital convert
54 digital signal processor
60 Distortion compensator
62 Periodic signal detector
63 Periodic signal detector
64 Compensation signal generator 68 Storage device
70 Switch (logical)
72 Distortion detector
74 Signaling input port
76 Controller
80 Optical carrier signal
82 Electrical detection signal
84 Output signal
86 Copropagating optical signal
90 Optical path
100 Distortion
110 Compensation of linear distortions (e.g. GVD)
112 Clock recovery
114 MIMO processing (equalization of polarization scrambling)
116 Carrier phase recovery
118 Decoding
120 Forward error correction
122 Compensation of periodic distortions (inventive part)
150, 150' Optical system
160 Optical network
180 Multiplex optical signal (optical carrier signal)
186 Multiplex optical signal (copropagating optical signal)
200 Fiber section
202 Time shift
204 Part of optical carrier signal
206 Strength of nonlinear interaction
250 Optical system
252-264 Network element
270 Optical switch
280-284 Network node
300-312 Method steps
304a Method step
400 Phase distortions
402 Waveform during one period
404 Compensation signal
406 Time basis
408 Period of the distortions

The invention claimed is:

1. A method of compensating at an optical receiver signal distortions induced in an optical carrier signal by a periodic copropagating optical signal, wherein the optical carrier signal and the copropagating optical signal copropagate at least in part, wherein the method comprises:
receiving, at the optical receiver, the optical carrier signal, wherein the optical carrier signal is distorted by the copropagating optical signal;
determining, at the optical receiver, a period of a periodic component of the distorted optical carrier signal;
determining, at the optical receiver, a periodic distortion of the distorted optical carrier signal;
generating a compensation signal to correct the distorted optical carrier signal according to the determined periodic distortion.

2. The method of claim 1, wherein the periodic distortion comprises a phase variation and/or an amplitude variation of the distorted optical carrier signal.

3. The method of claim 1, wherein determining the period of the periodic component of the distorted optical carrier signal comprises receiving an input signal indicating a period of the copropagating optical signal.

4. The method of claim 1, wherein determining the period of the periodic component of the distorted optical carrier signal comprises modelling the optical carrier signal or parts thereof by means of an analytical and/or numerical model, wherein the model preferably is a Bayesian-probabilistic model, wherein determining the period of the periodic component of the distorted optical carrier signal comprises using the Gregory and Loredo algorithm.

5. The method claim 1, wherein determining the periodic distortion of the distorted optical carrier signal comprises using a Viterbi-Viterbi phase recovery technique; and/or
wherein determining the periodic distortions of the distorted optical carrier signal caused by the copropagating optical signal comprises measuring a plurality of distortions of the distorted optical carrier signal, wherein each measurement corresponds to a time length equal to the determined period of the periodic component of the distorted optical carrier signal, and averaging over the plurality of measurements; and/or
wherein the method further comprises storing information about the compensation signal.

6. The method of claim 1, further comprising generating pulses of the copropagating optical signal having a predefined period; and/or
wherein the method further comprises emitting a trigger pulse before emitting a sequence of pulses of the copropagating optical signal, and inferring from the trigger pulse that an optical carrier signal to be received at the optical receiver is distorted by the sequence of pulses of the copropagating optical signal;
wherein generating pulses of the copropagating optical signal preferably comprises emitting a first sequence of pulses of the copropagating optical signal with a first optical power before emitting a second sequence of pulses of the copropagating optical signal with a second optical power, wherein the first optical power is smaller than the second optical power, wherein the method preferably further comprises compensating distortions caused by the pulses of the second sequence of pulses by scaling a first compensation signal determined for the pulses of the first sequence of pulses by a scaling factor, wherein the scaling factor corresponds to or is a function of a ratio of the second optical power to the first optical power; and/or
wherein the first optical power preferably is at least 2 times smaller than the second optical power, preferably at least 4 times smaller than the second optical power, more preferably at least 8 times smaller than the second optical power.

7. The method of claim 6, wherein generating pulses of the copropagating optical signal comprises progressively increasing the optical power of a sequence of pulses of the copropagating optical signal for a ramp up time at the beginning of the sequence of pulses;
wherein the ramp up time preferably is at least equal to 0.1, 0.5, 1.0, 1.5, 2.5, 5 or 10 times an averaging time corresponding to the product of the number of pulses used for averaging and the time distance between two successive pulses, and/or wherein generating pulses of the copropagating optical signal comprises progressively decreasing the optical power of a sequence of pulses of the copropagating optical signal for a ramp down time at the end of the sequence of pulses;
wherein the ramp down time preferably is at least equal to 0.1, 0.5, 1.0, 1.5, 2.5, 5 or 10 times an averaging time corresponding to the product of the number of pulses used for averaging and the time distance between two successive pulses.

8. The method of claim 1, wherein the copropagating optical signal is a codirectional or counterdirectional optical time domain reflectometry signal, or wherein the copropagating optical signal is a codirectional or counterdirectional optical supervisory channel signal; and/or wherein the optical carrier signal is a multichannel signal, and wherein the copropagating optical signal corresponds to one or more channels of the optical carrier signal.

9. The method of claim 1, further comprising receiving, at the optical receiver, the copropagating optical signal.

10. A non-transitory readable storage medium comprising executable instructions which, when executed by a processor, cause the processor to carry out the method of claim 1.

11. A signal processing unit configured for compensating signal distortions in an optical carrier signal caused by a periodic copropagating optical signal at an optical receiver, wherein the optical carrier signal and the copropagating signal copropagate at least in part, wherein the signal processing unit is configured for:
  determining a period of a periodic component of the distorted optical carrier signal;
  determining a periodic distortion of the carrier signal caused by the copropagating optical signal; and
  generating a compensation signal to correct the distorted optical carrier signal according to the determined periodic distortion,
  wherein the signal processing unit is preferably configured for carrying out the method of claim 1.

12. An optical system comprising an optical receiver for receiving an optical carrier signal, wherein the optical receiver comprises a signal processing unit according claim 11, wherein the signal processing unit is configured for compensating signal distortions in the optical carrier signal caused by a periodic copropagating optical signal, wherein the optical carrier signal and the copropagating signal copropagate in at least a part of an optical path connected or connectable to the optical system.

13. The optical system of claim 12, further comprising a copropagating signal emitter for emitting the copropagating optical signal having a predefined period, wherein the copropagating signal emitter is preferably configured for emitting the copropagating optical signal according to the method as defined by the additional features of claim 6.

14. The optical system of claim 13, wherein the copropagating signal emitter is configured to transmit an input signal to the signal processing unit of the optical receiver indicating a predefined period of the copropagating signal; and
  wherein the signal processing unit of the optical receiver is further configured for determining the period of the periodic component of the distorted optical carrier signal based on the received input signal.

15. The system of claim 12, wherein the optical system further comprises a storage device;
  wherein the signal processing unit is further configured for storing the generated compensation signal into the storage device and for using the stored compensation signal for compensating subsequent optical carrier signals;
  and/or
  wherein the copropagating signal emitter comprises an OTDR device and wherein the copropagating optical signal comprises an OTDR signal; and/or
  wherein the optical receiver of claim 12 are integrated in the same network node or network element.

* * * * *